(12) United States Patent
So et al.

(10) Patent No.: US 12,468,422 B2
(45) Date of Patent: Nov. 11, 2025

(54) INPUT SENSING DEVICE INCLUDING SENSOR DRIVER USING COMPENSATION MAPS, DISPLAY DEVICE HAVING THE SAME AND INPUT SENSING METHOD

(71) Applicant: SAMSUNG DISPLAY CO., LTD., Yongin-si (KR)

(72) Inventors: Yongsub So, Yongin-si (KR); Sanghun Park, Yongin-si (KR); Da Eun Yi, Yongin-si (KR); Bo-Hwan Lee, Yongin-si (KR); Byeongkyu Jeon, Yongin-si (KR); Keumdong Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 169 days.

(21) Appl. No.: 18/450,362

(22) Filed: Aug. 15, 2023

(65) Prior Publication Data
US 2024/0118769 A1 Apr. 11, 2024

(30) Foreign Application Priority Data

Oct. 7, 2022 (KR) .................. 10-2022-0128863
Dec. 14, 2022 (KR) .................. 10-2022-0174845

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC ............................ G06F 3/0418; G06F 3/0446
See application file for complete search history.

(56) References Cited

U.S. PATENT DOCUMENTS

| 11,573,663 B1* | 2/2023 | Yun ................. G06F 3/0446 |
| 2011/0234523 A1* | 9/2011 | Chang ............... G06F 3/0446 345/173 |

FOREIGN PATENT DOCUMENTS

KR     10-1606709     4/2016

* cited by examiner

*Primary Examiner* — Kwang-Su Yang
(74) *Attorney, Agent, or Firm* — F. CHAU & ASSOCIATES, LLC

(57) ABSTRACT

An input sensing device includes a sensor that includes a plurality of first electrodes and a plurality of second electrodes, and a sensor driver that operates in a first sensing mode and a second sensing mode. During the first sensing mode, the sensor driver generates a first sensing signal by transmitting transmission signals to the sensor and receiving reception signals from the sensor. During the second sensing mode, the sensor driver generates a second sensing signal by transmitting the transmission signals to the sensor and receiving the reception signals from the sensor. The sensor driver selects one of a plurality of compensation maps based on the first sensing signal, compensates for the second sensing signal based on the selected compensation map, and outputs the compensated sensing signal.

25 Claims, 16 Drawing Sheets

INPUT SENSING DEVICE INCLUDING SENSOR DRIVER USING COMPENSATION MAPS, DISPLAY DEVICE HAVING THE SAME AND INPUT SENSING METHOD

CROSS-REFERENCE TO RELATED APPLICATIONS

This application claims priority under 35 U.S.C. § 119 from Korean Patent Application No. 10-2022-0128863, filed on Oct. 7, 2022 in the Korean Intellectual Property Office, and No. 10-2022-0174845, filed on Dec. 14, 2022 in the Korean Intellectual Property Office, the contents of both of which are herein incorporated by reference in their entireties.

TECHNICAL FIELD

Embodiments of the present disclosure described herein are directed to a display device, and more particularly, to a display device that includes an input sensing device.

DISCUSSION OF THE RELATED ART

A display device that displays an image, such as a television, a mobile phone, a tablet computer, a navigation device, a game console, etc., may operate in response to a user input. In addition to a general input method such as a button, a keyboard, a mouse, etc., a display device may use a touch-based input method that allows a user to enter information or commands easily and intuitively.

SUMMARY

Embodiments of the present disclosure provide an input sensing device that more accurately detects a user input, and a display device that includes the same.

According to an embodiment, an input sensing device includes a sensor that includes a plurality of first electrodes and a plurality of second electrodes, and a sensor driver that operates in a first sensing mode and a second sensing mode. During the first sensing mode, the sensor driver generates a first sensing signal by transmitting transmission signals to the sensor and receiving reception signals from the sensor. During the second sensing mode, the sensor driver generates a second sensing signal by transmitting the transmission signals to the sensor and receiving the reception signals from the sensor. The sensor driver selects one of a plurality of compensation maps based on the first sensing signal, compensates the second sensing signal based on the selected compensation map, and outputs a compensated sensing signal.

In an embodiment, the sensor driver may generate the first sensing signal during a first sensing period of a first sensing frame, and may generate the second sensing signal during a second sensing period of the first sensing frame.

In an embodiment, during a first output frame, the sensor driver may output a coordinate signal that corresponds to the compensated second sensing signal. The second output frame may temporally overlap a second sensing frame. The second sensing frame may be continuous with the first sensing frame.

In an embodiment, the sensor driver may include a compensator that selects one of the plurality of compensation maps based on the first sensing signal and outputs the compensated sensing signal based on the selected compensation map.

In an embodiment, the plurality of compensation maps may include a plurality of first compensation maps and a plurality of second compensation maps. The compensator may select one of the plurality of first compensation maps that corresponds to the first sensing signal, may compensate the second sensing signal based on one of the plurality of second compensation maps that corresponds to the selected first compensation map, and may output the compensated sensing signal.

In an embodiment, each of the first compensation maps may store a representative value of a sensing signal according to an ambient temperature. The ambient temperature for each of the first compensation maps may differ from each other.

In an embodiment, the compensator may calculate a representative value of the first sensing signal, and may select one of the plurality of first compensation maps whose representative value is most similar to the representative value of the first sensing signal.

In an embodiment, the plurality of first compensation maps and the plurality of second compensation maps may have a one-to-one correspondence.

In an embodiment, during the first sensing mode, the sensor driver may transmit first transmission signals to the plurality of first electrodes, may transmit second transmission signals to the plurality of second electrodes, may receive a first reception signal from the plurality of first electrodes, may receive a second reception signal from the plurality of second electrodes, and may generate the first sensing signal based on the first transmission signal, the second transmission signal, the first reception signal, and the second reception signal.

In an embodiment, during the second sensing mode, the sensor driver may transmit the transmission signal to the plurality of first electrodes, may receive the reception signal from the plurality of second electrodes, and may generate the second sensing signal based on the reception signal.

In an embodiment, the sensor may include a sensing area and a peripheral area adjacent to the sensing area. The plurality of first electrodes may be arranged in the sensing area in a first direction. The plurality of second electrodes may be arranged in the sensing area in a second direction that crosses the first direction.

In an embodiment, the input sensing device may further include a plurality of first trace lines electrically connected to the plurality of first electrodes, respectively, and a plurality of second trace lines electrically connected to the plurality of second electrodes, respectively. The plurality of first trace lines and the plurality of second trace lines may overlap the sensing area.

In an embodiment, the plurality of first electrodes may be connected to the plurality of first trace lines through a plurality of first contacts, respectively. The plurality of second electrodes may be connected to the plurality of second trace lines through a plurality of second contacts, respectively. The plurality of second contacts may overlap the plurality of second electrodes, respectively.

In an embodiment, the sensor driver may further include a lookup table that compensates for a sensing signal received from the plurality of second electrodes. The sensor driver may compensate for the second sensing signal based on the selected compensation map, may perform a ghost compensation with reference to the lookup table, and may output the compensated sensing signal.

According to an embodiment, a display device includes a display panel, a sensor disposed on the display panel and that includes a sensing area and a peripheral area adjacent to the sensing area, and a sensor driver that drives the sensor. During a first sensing mode, the sensor driver generates a first sensing signal by transmitting transmission signals to the sensor and receiving reception signals from the sensor. During a second sensing mode, the sensor driver generates a second sensing signal by transmitting the transmission signals to the sensor and receiving the reception signals from the sensor. The sensor driver selects one of a plurality of compensation maps based on the first sensing signal, compensates the second sensing signal based on the selected compensation map, and outputs a compensated sensing signal.

In an embodiment, the sensor driver may generate the first sensing signal during a first sensing period of a first sensing frame, and may generate the second sensing signal during a second sensing period of the first sensing frame.

In an embodiment, the plurality of compensation maps may include a plurality of first compensation maps and a plurality of second compensation maps. The sensor driver may select one of the plurality of first compensation maps that corresponds to the first sensing signal, may compensate the second sensing signal based on one of the plurality of second compensation maps that corresponds to the selected first compensation map, and may output the compensated sensing signal.

In an embodiment, each of the first compensation maps may store a representative value of a sensing signal according to an ambient temperature. The ambient temperature for each of the first compensation maps may differ from each other.

In an embodiment, the compensator may calculate a representative value of the first sensing signal, and may select one of the plurality of first compensation maps whose representative value is most similar to the representative value of the first sensing signal In an embodiment, the sensor may include a plurality of first electrodes disposed in the sensing area and arranged in a first direction, a plurality of second electrodes disposed in the sensing area and arranged in a second direction that crosses the first direction, a plurality of first trace lines that connect the plurality of first electrodes to the sensor driver, and a plurality of second trace lines that connect the plurality of second electrodes to the sensor driver.

In an embodiment, the plurality of first electrodes may be connected to the plurality of first trace lines through a plurality of first contacts, respectively. The plurality of second electrodes may be connected to the plurality of second trace lines through a plurality of second contacts, respectively. The plurality of second contacts may overlap the plurality of second electrodes, respectively.

In an embodiment, the sensor driver may further include a lookup table that compensates a sensing signal received from the plurality of second electrodes. The sensor driver may compensate the second sensing signal based on the selected compensation map, may perform a ghost compensation with reference to the lookup table, and may output the compensated sensing signal.

According to an embodiment, an input sensing method includes receiving a first sensing signal from a sensor by operating in a first sensing mode, selecting a compensation map that corresponds to the first sensing signal from a plurality of compensation maps, receiving a second sensing signal from the sensor by operating in a second sensing mode, compensating the second sensing signal based on the compensation map and outputting a compensated sensing signal, and outputting a coordinate signal that corresponds to the compensated sensing signal.

In an embodiment, the plurality of compensation maps includes a plurality of first compensation maps and a plurality of second compensation maps. Selecting the compensation map that corresponds to the first sensing signal from the plurality of compensation maps may include selecting one of the plurality of first compensation maps that corresponds to the first sensing signal, and selecting one of the plurality of second compensation maps that corresponds to the selected first compensation map as the compensation map.

In an embodiment, each of the first compensation maps may store a representative value of a sensing signal according to an ambient temperature, where the ambient temperature for each of the first compensation maps may differ from each other. Selecting the compensation map that corresponds to the first sensing signal from the plurality of compensation maps may include calculating a representative value of the first sensing signal and selecting one of the plurality of first compensation maps whose representative value is most similar to the representative value of the first sensing signal.

DETAILED DESCRIPTION

Figure 1:
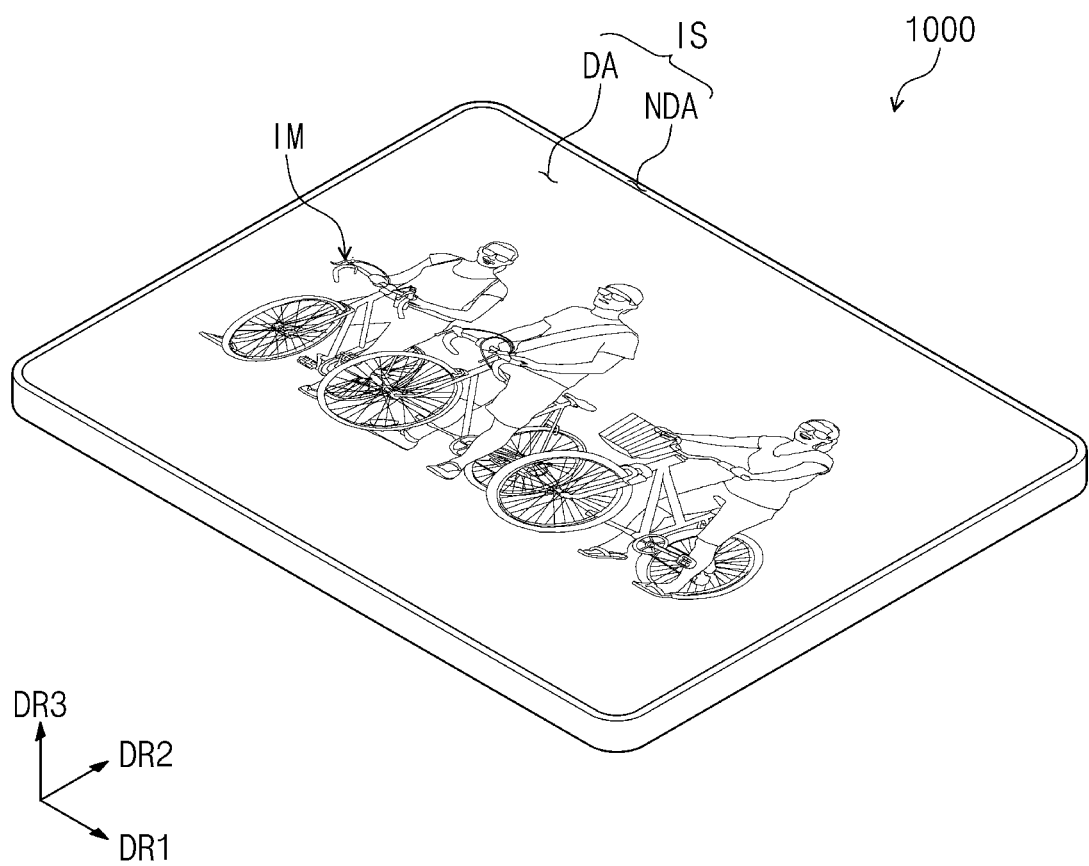
FIG. 1 is a plan view of a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals may refer to like components.

Hereinafter, embodiments of the present disclosure will be described with reference to accompanying drawings.

FIG. 1 is a plan view of a display device 1000, according to an embodiment of the present disclosure.

Referring to FIG. 1, in an embodiment, a display device 1000 can be activated by an electrical signal. The display device 1000 can be incorporated into electronic devices that display images, such as mobile phones, tablets, smart watches, laptops, computers, smart televisions, and navigation devices. FIG. 1 illustrates a mobile phone as an example.

The display device 1000 displays an image IM on a display surface IS parallel to each of a first direction DR1 and a second direction DR2. The display surface IS on which the image IM is displayed corresponds to a front surface of the display device 1000. The image IM may include a still image as well as a moving image. A normal direction of the display surface IS, such as a thicknesses direction of the display device 1000, corresponds to a third direction DR3. A front surface (or an upper surface) and a back surface (or a lower surface) of each layer or unit described below are determined with reference to the third direction DR3.

The display surface IS of the display device 1000 is divided into a display area DA and a non-display area NDA. The display area DA is where the image IM is displayed. A user perceives (or views) the image IM through the display area DA. In an embodiment, the display area DA is illustrated in the shape of a rectangle with rounded vertexes. However, embodiments are not necessarily limited thereto. The display area DA may have various shapes in other embodiments.

The non-display area NDA is adjacent to the display area DA. The non-display area NDA has a given color. The non-display area NDA surrounds the display area DA. Accordingly, a shape of the display area DA is substantially defined by the non-display area NDA. However, embodiments are not necessarily limited thereto. In other embodiments, the non-display area NDA is adjacent to only one side of the display area DA or is omitted.

Figure 2:
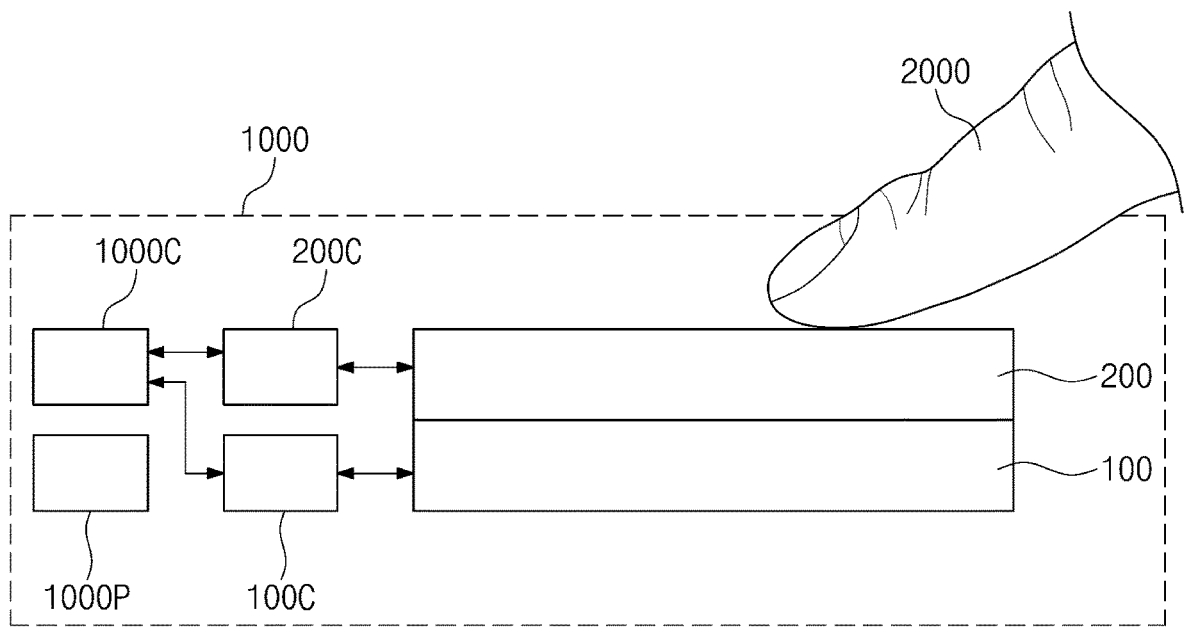
FIG. 2 is a block diagram of a display device, according to an embodiment of the present disclosure.

FIG. 2 is a block diagram of the display device 1000, according to an embodiment of the present disclosure.

Referring to FIG. 2, in an embodiment, the display device 1000 includes a display layer 100, a sensor 200, a display driver 100C, a sensor driver 200C, a main driver 1000C, and a power supply circuit 1000P.

The display layer 100 generates an image. The display layer 100 is a light emitting display layer. For example, the display layer 100 is one of an organic light emitting display layer, an inorganic light emitting display layer, an organic-inorganic light emitting display layer, a quantum dot display layer, a micro-LED display layer, or a nano-LED display layer.

The sensor 200 is disposed on the display layer 100. The sensor 200 can detect an external applied input. The sensor 200 may be an integral sensor that is continuously formed during a manufacturing process of the display layer 100 or may be an external sensor attached to the display layer 100.

The main driver 1000C controls overall operations of the display device 1000. For example, the main driver 1000C controls operations of the display driver 100C and the sensor driver 200C. The main controller 1000C includes at least one microprocessor, and the main controller 1000C may be referred to as a "host". The main driver 1000C may further include a graphic controller.

The display driver 100C drives the display layer 100. The display driver 100C receives image data and a control signal from the main driver 1000C. The control signal includes various signals. For example, the control signal includes an input vertical synchronization signal, an input horizontal synchronization signal, a main clock, and a data enable signal.

In an embodiment, the input sensing device includes the sensor 200 and the sensor driver 200C. The sensor driver 200C drives the sensor 200. The sensor driver 200C receives a control signal from the main driver 1000C. The control signal includes a clock signal of the sensor driver 200C.

The power supply circuit 1000P includes a power management integrated circuit (PMIC). The power supply circuit 1000P generates a plurality of driving voltages that drive the display layer 100, the sensor 200, the display driver 100C, and the sensor driver 200C. For example, the plurality of driving voltages includes a gate high voltage, a gate low voltage, an ELVSS voltage, an ELVDD voltage, an initialization voltage, etc., but are not necessarily limited thereto.

The display device 1000 detects externally applied inputs. For example, the display device 1000 can detect a passive input by a touch 2000. The touch 2000 encompasses all input means that can change a capacitance, such as a user's body or a passive pen.

Figure 3:
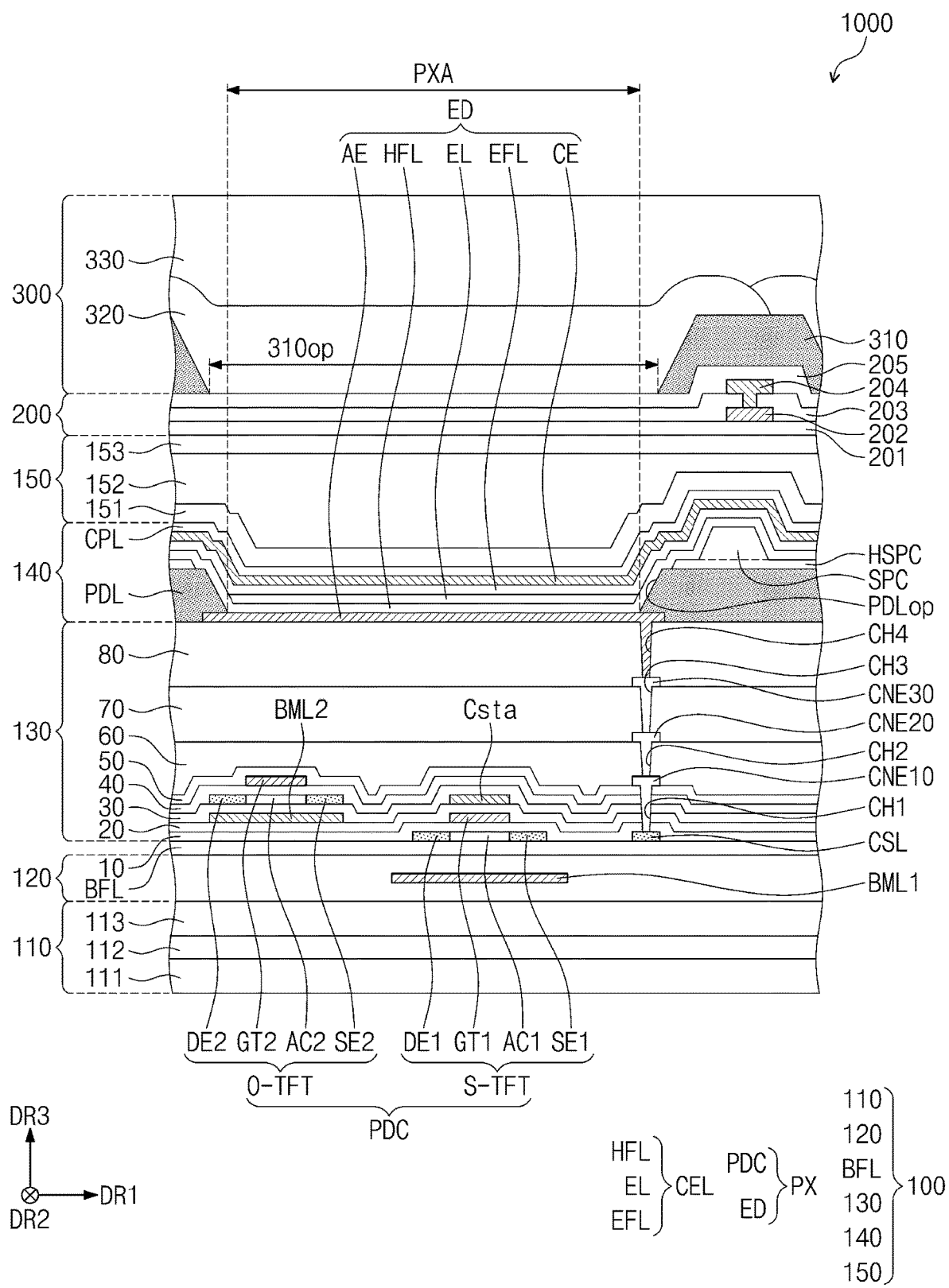
FIG. 3 is a cross-sectional view of a display device, according to an embodiment of the present disclosure.

FIG. 3 is a cross-sectional view of the display device 1000, according to an embodiment of the present disclosure.

Referring to FIG. 3, in an embodiment, the display device 1000 includes the display layer 100, the sensor 200, and an anti-reflection layer 300. The display layer 100 includes a base layer 110, a barrier layer 120, a buffer layer BFL, a circuit layer 130, an element layer 140, and an encapsulation layer 150.

The base layer 110 may have a single layer or multi-layer structure. For example, the base layer 110 includes first to third sub-base layers 111, 112, and 113. Each of the first sub-base layer 111 and the third sub-base layer 113 includes at least one of a polyimide-based resin, an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. Note that the phrase "~~"-based resin in the specification means including the functional group of "~~". For example, each of the first sub-base layer 111 and the third sub-base layer 113 includes polyimide.

The second sub-base layer 112 may have a single layer or multi-layer structure. For example, the second sub-base layer 112 includes an inorganic material, and includes at least one of silicon oxide, silicon nitride, silicon oxynitride, or amorphous silicon. For example, the second sub-base layer 112 includes silicon oxynitride and silicon oxide stacked thereon.

The barrier layer 120 is disposed on the base layer 110. The barrier layer 120 may have a single layer or multi-layer structure. For example, the barrier layer 120 includes at least one of silicon oxide, silicon nitride, silicon oxynitride, or amorphous silicon.

The barrier layer 120 further includes a first lower light-shielding layer BML1. For example, when the barrier layer 120 has a multi-layer structure, the first lower light-shielding layer BML1 is interposed between that layers that constitute the barrier layer 120. However, embodiments are not necessarily limited thereto, and in other embodiments, the first lower light-shielding layer BML1 is interposed between the base layer 110 and the barrier layer 120 or is disposed on the barrier layer 120. In an embodiment, the first lower light-shielding layer BML1 is omitted. The first lower light-shielding layer BML1 may be referred to as a "first lower layer", a "first lower metal layer", a "first lower electrode layer", a "first lower shielding layer", a "first light-shielding layer", a "first metal layer", a "first shielding layer", or a "first overlapping layer".

The buffer layer BFL is disposed on the barrier layer 120. The buffer layer BFL prevents metal atoms or impurities from diffusing into a first semiconductor pattern. In addition, the buffer layer BFL adjusts a rate of heating during a crystallization process that forms the first semiconductor pattern, such that the first semiconductor pattern is uniformly formed.

The buffer layer BFL includes a plurality of inorganic layers. For example, the buffer layer BFL includes a first sub buffer layer that includes silicon nitride, and a second sub buffer layer that is disposed on the first sub buffer layer and includes silicon oxide.

The circuit layer 130 is disposed on the buffer layer BFL. The element layer 140 is disposed on the circuit layer 130 and includes a light emitting element ED. The light emitting element ED is part of a pixel PX that includes a pixel circuit PDC electrically connected to the light emitting element ED.

FIG. 3 shows a silicon thin film transistor S-TFT and an oxide thin film transistor O-TFT of the pixel circuit PDC. However, embodiments are not necessarily limited thereto, and in other embodiment, all of the transistors that constitute the pixel circuit PDC are silicon thin film transistors S-TFT or are oxide thin film transistors O-TFT.

A first semiconductor pattern is disposed on the buffer layer BFL. The first semiconductor pattern includes a silicon semiconductor. For example, the silicon semiconductor includes amorphous silicon or polycrystalline silicon. For example, the first semiconductor pattern includes low-temperature polysilicon.

FIG. 3 illustrates only a portion of the first semiconductor pattern disposed on the buffer layer BFL. Another portion of the first semiconductor pattern is further disposed in another area. The first semiconductor pattern is arranged across the pixels according to a specific rule. The first semiconductor pattern has electrical characteristics that differ depending on whether the first semiconductor pattern is doped. The first semiconductor pattern includes a first area that has high conductivity and a second area that has low conductivity. The first area is doped with one of an N-type dopant or a P-type dopant. A P-type transistor is an area doped with the P-type dopant, and an N-type transistor is an area doped with the N-type dopant. The second area is an undoped area or an area doped with a lower concentration lower than the first area.

The conductivity of the first area is greater than the conductivity of the second area. The first area serves as an electrode or a signal line. The second area corresponds to an active area (or a channel) of a transistor. For example, a part of the semiconductor pattern is an active area of the transistor. Another part thereof is a source or drain of the transistor. Another part thereof is a connection electrode or a connection signal line.

A source area SE1, an active area AC1, and a drain area DE1 of the silicon thin film transistor S-TFT are formed from the first semiconductor pattern. The source area SE1 and the drain area DE1 extend in opposite directions from the active area AC1, when viewed in a cross-sectional view.

A portion of a connection signal line CSL formed from the first semiconductor pattern is illustrated in FIG. 3.

The circuit layer 130 includes a plurality of inorganic layers and a plurality of organic layers. In an embodiment, first to fifth insulating layers 10, 20, 30, 40, and 50 that are sequentially stacked on the buffer layer BFL are inorganic layers, and sixth to eighth insulating layers 60, 70, and 80 are organic layers.

The first insulating layer 10 is disposed on the buffer layer BFL. The first insulating layer 10 covers the first semiconductor pattern. The first insulating layer 10 may be an inorganic layer and/or an organic layer, and may have a single layer or multi-layer structure. The first insulating layer 10 includes at least one of an aluminum oxide, a titanium oxide, a silicon oxide, silicon nitride, a silicon oxynitride, a zirconium oxide, or a hafnium oxide. In an embodiment, the first insulating layer 10 is a single silicon oxide layer. In addition to the first insulating layer 10, an insulating layer of the circuit layer 130 to be described below may also have a single layer structure or a multi-layer structure.

A gate electrode GT1 of the silicon thin film transistor S-TFT is disposed on the first insulating layer 10. The gate electrode GT1 is a portion of a metal pattern. The gate electrode GT1 overlaps the active area AC1. The gate electrode GT1 functions as a mask in a process of doping the first semiconductor pattern. The gate electrode GT1 includes at least one of titanium, silver, an alloy that contains silver, molybdenum, an alloy that contains molybdenum, aluminum, an alloy that contains aluminum, aluminum nitride, tungsten, tungsten nitride, copper, indium tin oxide, or indium zinc oxide, but embodiments are not necessarily limited thereto.

The second insulating layer 20 is disposed on the first insulating layer 10 and covers the gate electrode GT1. The second insulating layer 20 is an inorganic layer, and may have a single layer structure or a multi-layer structure. The second insulating layer 20 includes at least one of silicon oxide, silicon nitride, or silicon oxynitride. In an embodiment, the second insulating layer 20 has a single layer structure that includes a silicon nitride layer.

A third insulating layer 30 is disposed on the second insulating layer 20. The third insulating layer 30 is an inorganic layer, and may have a single layer structure or a multi-layer structure. For example, the third insulating layer 30 has a multi-layer structure that includes a silicon oxide layer and a silicon nitride layer. A first electrode Csta of a capacitor is interposed between the second insulating layer 20 and the third insulating layer 30. In addition, a second electrode of the capacitor is interposed between the first insulating layer 10 and the second insulating layer 20. In an embodiment, the second electrode of the capacitor is the gate electrode GT1.

A second semiconductor pattern is disposed on the third insulating layer 30. The second semiconductor pattern includes an oxide semiconductor. The oxide semiconductor includes a plurality of areas that are distinguished from each other depending on whether the metal oxide is reduced. An area, hereinafter referred to as a "reduction area", in which the metal oxide is reduced has a higher conductivity than an area, hereinafter referred to as a "non-reduction area", in which the metal oxide is not reduced. The reduction area serves as a source area/drain area of a transistor or a signal line. The non-reduction area corresponds to an active area or a channel of the transistor. For example, a part of the second semiconductor pattern is the active area of the transistor;

another part thereof may be the source/drain area of the transistor; and the other part thereof is a signal transmission area.

A source area SE2, an active area AC2, and a drain area DE2 of the oxide thin film transistor O-TFT are formed from the second semiconductor pattern. The source area SE2 and the drain area DE2 extend in opposite directions from the active area AC2, when viewed in a cross-sectional view.

The fourth insulating layer 40 is disposed on the third insulating layer 30. The fourth insulating layer 40 covers the second semiconductor pattern. The fourth insulating layer 40 is an inorganic layer, and may have a single layer structure or a multi-layer structure. The fourth insulating layer 40 includes at least one of an aluminum oxide, a titanium oxide, a silicon oxide, a silicon nitride, a silicon oxynitride, a zirconium oxide, or a hafnium oxide. In an embodiment, the fourth insulating layer 40 has a single layer structure that includes silicon oxide.

A gate electrode GT2 of the oxide thin film transistor O-TFT is disposed on the fourth insulating layer 40. The gate electrode GT2 is a portion of a metal pattern. The gate electrode GT2 overlaps the active area AC2. The gate electrode GT2 functions as a mask in a process of reducing the second semiconductor pattern.

A second lower light-shielding layer BML2 is disposed under the oxide thin film transistor O-TFT. The second lower light-shielding layer BML2 is interposed between the second insulating layer 20 and the third insulating layer 30. The second lower light-shielding layer BML2 includes the same material as the first electrode Csta of the capacitor and may be formed through the same process.

The fifth insulating layer 50 is disposed on the fourth insulating layer 40 and covers the gate electrode GT2. The fifth insulating layer 50 may be an inorganic layer, and may have a single layer structure or a multi-layer structure. For example, the fifth insulating layer 50 has a multi-layer structure that includes a silicon oxide layer and a silicon nitride layer.

A first connection electrode CNE10 is disposed on the fifth insulating layer 50. The first connection electrode CNE10 is connected to the connection signal line CSL through a first contact hole CH1 that penetrates the first to fifth insulating layers 10, 20, 30, 40, and 50.

The sixth insulating layer 60 is disposed on the fifth insulating layer 50. The sixth insulating layer 60 is an organic layer. A second connection electrode CNE20 is disposed on the sixth insulating layer 60. The second connection electrode CNE20 is connected to the first connection electrode CNE10 through a second contact hole CH2 that penetrates the sixth insulating layer 60.

The seventh insulating layer 70 is disposed on the sixth insulating layer 60 and cover the second connection electrode CNE20. The seventh insulating layer 70 is an organic layer.

A third connection electrode CNE30 is disposed on the seventh insulating layer 70. The third connection electrode CNE30 is connected to the second connection electrode CNE20 through a third contact hole CH3 that penetrates the seventh insulating layer 70. The eighth insulating layer 80 is disposed on the seventh insulating layer 70 and covers the third connection electrode CNE30.

Each of the sixth insulating layer 60, the seventh insulating layer 70, and the eighth insulating layer 80 is an organic layer. For example, each of the sixth insulating layer 60, the seventh insulating layer 70, and the eighth insulating layer 80 includes general purpose polymers such as one or more of benzocyclobutene (BCB), polyimide, hexamethyldisiloxane (HMDSO), polymethylmethacrylate (PMMA), or polystyrene (PS), polymer derivatives having a phenolic group, an acrylic polymer, an imide-based polymer, an arylether-based polymer, an amide-based polymer, a fluorine-based polymer, a p-xylene-based polymer, a vinyl alcohol-based polymer, or a blend thereof.

The light emitting element ED, which is part of the element layer 140, is disposed on the eighth insulating layer 80. The light emitting element ED includes a first electrode AE, a first functional layer HFL, a light emitting layer EL, a second functional layer EFL, and a second electrode CE. The first functional layer HFL, the second functional layer EFL, and the second electrode CE are provided in common to all pixels PX. The first functional layer HFL, the light emitting layer EL, and the second functional layer EFL may be referred to as an "intermediate layer CEL". The first electrode AE may be referred to as a "pixel electrode" or "anode". The second electrode CE may be referred to as a "common electrode" or "cathode".

The first electrode AE is disposed on the eighth insulating layer 80. The first electrode AE is connected to the third connection electrode CNE30 that is electrically connected to the pixel circuit PDC through a fourth contact hole CH4 that penetrates the eighth insulating layer 80.

In an embodiment of the present disclosure, the third connection electrode CNE30 is omitted. For example, the first electrode AE is connected to the second connection electrode CNE20 by penetrating the seventh and eighth insulating layers 70 and 80. Moreover, in an embodiment of the present disclosure, the third connection electrode CNE30 and the eighth insulating layer 80 are omitted. For example, the first electrode AE is disposed on the seventh insulating layer 70 and is connected to the second connection electrode CNE20 by penetrating the seventh insulating layer 70.

The first electrode AE is a transmissive (semi-transmissive) electrode or a reflective electrode. According to an embodiment, the first electrode AE includes a reflective layer formed of at least one of silver, magnesium, aluminum, platinum, palladium, gold, nickel, neodymium, iridium, chromium, or a compound thereof, and a transparent or semi-transparent electrode layer formed on the reflective layer. The transparent or semi-transparent electrode layer includes at least one of indium tin oxide, indium zinc oxide, indium gallium zinc oxide, zinc oxide or indium oxide, and aluminum-doped zinc oxide. For example, the first electrode AE includes a multi-layer structure in which indium tin oxide, silver, and indium tin oxide are sequentially stacked.

The element layer 140 further includes a pixel defining layer PDL that is disposed on the eighth insulating layer 80. The pixel defining layer PDL absorbs light. For example, the pixel defining layer PDL is black. The pixel defining layer PDL includes a black coloring agent. The black coloring agent includes a black dye and/or a black pigment. The black coloring agent includes at least one of carbon black, a metal such as chromium, or an oxide thereof.

An opening PDLop that exposes one portion of the first electrode AE is formed in the pixel defining layer PDL. For example, the pixel defining layer PDL covers an edge of the first electrode AE. An emission area PXA is defined by the opening PDLop in the pixel defining layer PDL.

A spacer HSPC is disposed on the pixel defining layer PDL. A protruding spacer SPC is disposed on the spacer HSPC. The spacer HSPC and the protruding spacer SPC have an integral shape and are formed of the same materials. For example, the spacer HSPC and the protruding spacer SPC are formed through the same process by a halftone mask. However, embodiments are not necessarily limited thereto. In some embodiments, the spacer HSPC and the protruding spacer SPC include different materials or are formed by separate processes.

The first functional layer HFL is disposed on the first electrode AE, the pixel defining layer PDL, the spacer HSPC, and the protruding spacer SPC. The first functional layer HFL includes a hole transport layer (HTL) or a hole injection layer (HIL), or includes both a hole transport layer and a hole injection layer. The first functional layer HFL is disposed throughout the display area.

The light emitting layer EL is disposed on the first functional layer HFL in an area that corresponds to the opening PDLop of the pixel defining layer PDL. The light emitting layer EL may include organic, inorganic, or organic-inorganic materials that emit light of a predetermined color.

The second functional layer EFL is disposed on the first functional layer HFL and covers the light emitting layer EL. The second functional layer EFL includes an electron transport layer (ETL) or an electron injection layer (EIL), or both an electron transport layer and an electron injection layer. The second functional layer EFL is disposed throughout the display area.

The second electrode CE is disposed on the second functional layer EFL. The second electrode CE is disposed throughout the display area.

The element layer 140 further includes a capping layer CPL disposed on the second electrode CE. The capping layer CPL improves emission efficiency by the principle of constructive interference. For example, the capping layer CPL includes a material that has a refractive index of 1.6 or higher for light that has a wavelength of 589 nm. The capping layer CPL may be an organic capping layer that includes organic materials, an inorganic capping layer that includes inorganic materials, or a composite capping layer that includes organic and inorganic materials. For example, the capping layer includes at least one of a carbocyclic compound, a heterocyclic compound, an amine group-containing compound, porphine derivatives, phthalocyanine derivatives, naphthalocyanine derivatives, alkali metal complexes, alkaline earth metal complexes, or any combination thereof. The carbocyclic compound, the heterocyclic compound, and the amine group-containing compound may be selectively replaced with a substituent that includes at least one of oxygen (O), nitrogen (N), sulfur (S), selenium (Se), silicon (Si), fluorine (F), chlorine (Cl), bromine (Br), iodine (I), or any combination thereof.

The encapsulation layer 150 is disposed on the element layer 140. The encapsulation layer 150 includes a first inorganic encapsulation layer 151, an organic encapsulation layer 152, and a second inorganic encapsulation layer 153 that are sequentially stacked. The first and second inorganic encapsulation layers 151 and 153 protect the element layer 140 from moisture and oxygen, and the organic encapsulation layer 152 protects the element layer 140 from foreign substances such as dust particles.

In an embodiment of the present disclosure, a low refractive index layer is further disposed between the capping layer CPL and the encapsulation layer 150. The low refractive index layer includes lithium fluoride. The low refractive index layer is formed in a thermal evaporation process.

The sensor 200 is disposed on the display layer 100. The sensor 200 may be referred to as a "sensor layer", an "input sensing layer", or an "input sensing panel". The sensor 200 includes a sensor base layer 201, a first sensor conductive layer 202, a sensor insulating layer 203, a second sensor conductive layer 204, and a sensor cover layer 205.

The sensor base layer 201 is directly disposed on the display layer 100. In an embodiment, the sensor base layer 201 is an inorganic layer that includes at least one of silicon nitride, silicon oxynitride, and silicon oxide. Alternatively, in an embodiment, the sensor base layer 201 is an organic layer that includes at least one of an epoxy resin, an acrylate resin, or an imide-based resin. The sensor base layer 201 may have a single layer structure or a multi-layer structure stacked in the third direction DR3.

Each of the first sensor conductive layer 202 and the second sensor conductive layer 204 may have a single layer structure or a multi-layer structure stacked in the third direction DR3.

A single-layer conductive layer includes one of a metal layer or a transparent conductive layer. The metal layer includes one of molybdenum (Mo), silver (Ag), titanium (Ti), copper (Cu), aluminum (Al), or an alloy thereof. The transparent conductive layer includes a transparent conductive oxide (TCO) such as one of indium tin oxide (ITO), indium zinc oxide (IZO), zinc oxide, or indium zinc tin oxide (IZTO). In addition, the transparent conductive layer includes a conductive polymer such as at least one of poly(3,4-ethylenedioxythiophene)(PEDOT), a metal nano wire, graphene, etc.

A multi-layered conductive layer includes metal layers. For example, the metal layers have a three-layer structure of titanium/aluminum/titanium. The multi-layered conductive layer includes at least one metal layer and at least one transparent conductive layer.

The sensor insulating layer 203 is interposed between the first sensor conductive layer 202 and the second sensor conductive layer 204. The sensor insulating layer 203 includes an inorganic film. The inorganic film includes at least one of aluminum oxide, titanium oxide, silicon oxide, silicon nitride, silicon oxynitride, zirconium oxide, or hafnium oxide.

Alternatively, in an embodiment, the sensor insulating layer 203 includes an organic film. The organic film includes at least one of an acrylate-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

The sensor cover layer 205 is disposed on the sensor insulating layer 203 and covers the second sensor conductive layer 204. The second sensor conductive layer 204 includes a conductive pattern. The sensor cover layer 205 covers the conductive pattern and reduces or eliminates damage to the conductive pattern in a subsequent process. The sensor cover layer 205 includes an inorganic material. For example, the sensor cover layer 205 includes silicon nitride, but is not necessarily limited thereto. In an embodiment of the present disclosure, the sensor cover layer 205 is omitted.

The anti-reflection layer 300 is disposed on the sensor 200. The anti-reflection layer 300 includes a division layer 310, a plurality of color filters 320, and a planarization layer 330.

The division layer 310 overlaps the conductive pattern of the second sensor conductive layer 204. The sensor cover layer 205 is interposed between the division layer 310 and the second sensor conductive layer 204. The division layer 310 prevents reflection of external light from the second sensor conductive layer 204. The division layer 310 is formed of a material that absorbs light, and the material constituting the division layer 310 is not otherwise limited thereto. The division layer 310 is black, and, in an embodiment, the division layer 310 includes a black coloring agent. The black coloring agent includes a black dye or a black pigment. The black coloring agent includes at least one of carbon black, a metal such as chromium, or an oxide thereof.

A division opening 310op is formed in the division layer 310. The division opening 310op overlaps the light emitting layer EL and the opening PDLop in the pixel defining layer PDL. The color filter 320 is disposed in the division opening 310op and overlaps edges of the division layer 310. The color filter 320 transmits light emitted from the light emitting layer EL.

The planarization layer 330 covers the division layer 310 and the color filter 320. The planarization layer 330 includes an organic material, and provides the anti-reflection layer 300 with a flat upper surface. In an embodiment, the planarization layer 330 is omitted.

In an embodiment of the present disclosure, the anti-reflection layer 300 includes a reflection adjustment layer instead of the color filters 320. For example, the color filter 320 is omitted from the structure of FIG. 3, and a reflection adjustment layer is added at a location where the color filter 320 is omitted. The reflection adjustment layer selectively absorbs light in a partial band of light reflected from inside the display panel and/or an electronic device or external light incident to the display panel and/or the electronic device.

For example, the reflection adjustment layer absorbs light in a first wavelength between 490 nm and 505 nm and light in a second wavelength between 585 nm and 600 nm such that light transmittance in the first wavelength and the second wavelength becomes 40% or less. The reflection adjustment layer absorbs light having a wavelength out of a wavelength range of the red, green, or blue light emitted from the light emitting layer EL. For example, the reflection adjustment layer absorbs light that has a wavelength that does not belong to a wavelength range of the red, green, or blue emitted from the light emitting layer EL, thereby preventing or minimizing a decrease in the luminance of a display panel and/or an electron device. In addition, a decrease in luminous efficiency of the display panel and/or electron device is prevented or minimized, and visibility is increased at the same time.

The reflection adjustment layer includes an organic material layer that includes dyes, pigments, or a combination thereof. The reflection adjustment layer includes one or more of a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, or a combination thereof.

In an embodiment, the reflection adjustment layer has a transmittance of about 64% to 72%. The transmittance of the reflection adjustment layer is adjusted by varying the amount of pigment and/or dye in the reflection adjustment layer.

In an embodiment of the present disclosure, the anti-reflection layer 300 includes a phase retarder and/or a polarizer. For example, the anti-reflection layer 300 includes at least one polarizing film. The anti-reflection layer 300 is attached to the sensor 200 through an adhesive layer.

Figure 4:
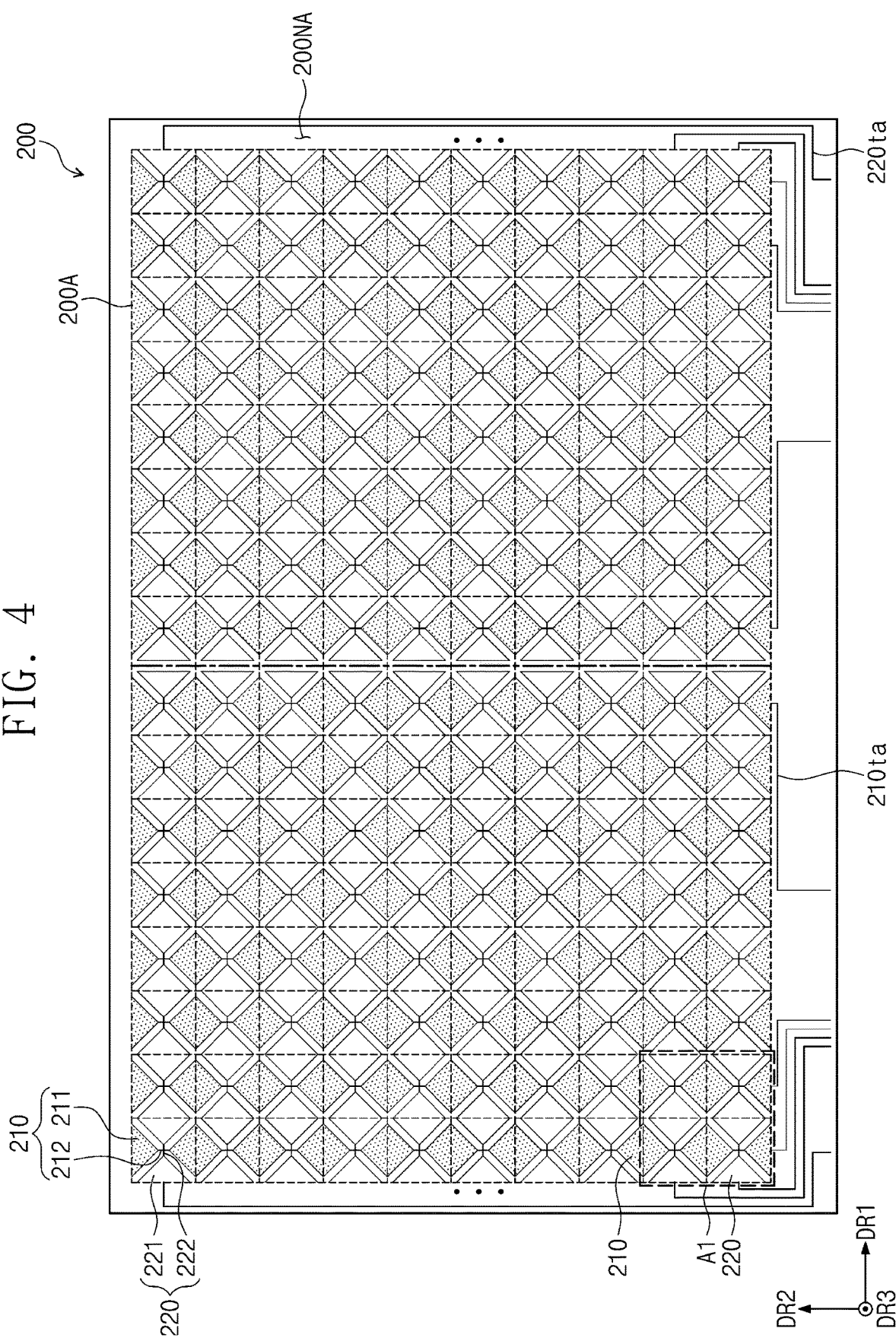
FIG. 4 is a plan view of a sensor, according to an embodiment of the present disclosure.

FIG. 4 is a plan view of the sensor 200, according to an embodiment of the present disclosure.

Referring to FIG. 4, in an embodiment, a sensing area 200A and a peripheral area 200NA adjacent to the sensing area 200A are defined in the sensor 200.

The sensor 200 includes a plurality of first electrodes 210 and a plurality of second electrodes 220 disposed in the sensing area 200A. The first electrodes 210 are arranged in the first direction DR1. The second electrodes 220 are arranged in the second direction DR2 that crosses the first direction DR1. Each of the first electrodes 210 extends in the second direction DR2. Each of the first electrodes 210 intersects the second electrodes 220. Each of the second electrodes 220 extends in the first direction DR1. Each of the second electrodes 220 intersects the first electrodes 210.

FIG. 4 shows sixteen first electrodes 210 and ten second electrodes 220. However, the number of first electrodes 210 and the number of second electrodes 220 are not necessarily limited thereto. For example, the number of first electrodes 210 and the number of second electrodes 220 changes depending on an aspect ratio of the display device 1000 (see FIG. 1).

Each of the first electrodes 210 includes a first portion 211 and a second portion 212. The first portion 211 and the second portion 212 are integral formed with each other and are disposed on the same layer. Each of the second electrodes 220 includes a sensing pattern 221 and a connection pattern 222. Two adjacent sensing patterns 221 are electrically connected to each other by two connection patterns 222, but are not necessarily limited thereto.

In an embodiment of the present disclosure, the first portion 211 and the second portion 212 are disposed on the same layer as the sensing pattern 221. The sensing pattern 221, the first portion 211, and the second portion 212 have a mesh shape. The sensing pattern 221 and the connection patterns 222 are disposed on different layers from each other. Two connection patterns 222 intersect with the second portion 212 in an insulation scheme. The first portion 211, the second portion 212, and the sensing pattern 221 are included in the second sensor conductive layer 204 shown in FIG. 3. The connection patterns 222 are included in the first sensor conductive layer 202 shown in FIG. 3. However, embodiments are not necessarily limited thereto. In an embodiment, the first portion 211, the second portion 212, and the sensing pattern 221 are included in the first sensor conductive layer 202 shown in FIG. 3, and the connection patterns 222 are included in the second sensor conductive layer 204 shown in FIG. 3.

In an embodiment of the present disclosure, the first portion 211 and the second portion 212 are disposed on the same layer as each other. The sensing pattern 221 and the connection patterns 222 are disposed on the same layer as each other. For example, the first portion 211 and the second portion 212 are included in the first sensor conductive layer 202 shown in FIG. 3. The sensing pattern 221 and the connection patterns 222 are included in the second sensor conductive layer 204 shown in FIG. 3. However, embodiments are not necessarily limited thereto. In an embodiment, the first portion 211 and the second portion 212 are included in the second sensor conductive layer 204 shown in FIG. 3, and the sensing pattern 221 and the connection patterns 222 are included in the first sensor conductive layer 202 shown in FIG. 3.

The sensor 200 includes a plurality of first trace lines 210ta electrically connected to the first electrodes 210 and a plurality of second trace lines 220ta electrically connected to the second electrodes 220.

In an embodiment, the first electrodes 210 and the second electrodes 220 are disposed in the sensing area 200A. The first trace lines 210*ta* and the second trace lines 220*ta* are disposed in the peripheral area 200NAa.

FIG. 4 shows that the one first trace line 210*ta* is electrically connected to the one first electrode 210 and the one second trace line 220*ta* is electrically connected to the one second electrode 220, but embodiments are not necessarily limited thereto. In some embodiments, two first trace lines 210*ta* are electrically connected to the one first electrode 210 and two second trace lines 220*ta* are electrically connected to the one second electrode 220, or two first trace lines 210*ta* are electrically connected to the one first electrode 210 and two second trace lines 220*ta* are electrically connected to the one second electrode 220.

Figure 5A:
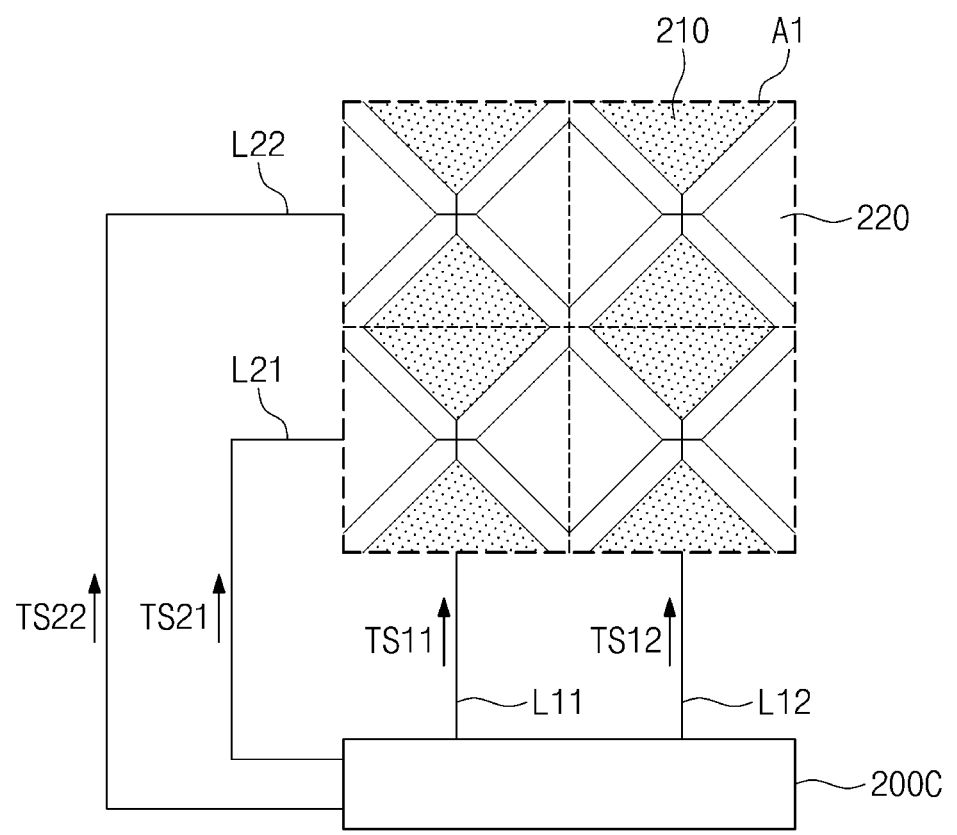
FIGS. 5A and 5B illustrate an operation of an input sensing device in a first sensing mode, according to an embodiment of the present disclosure.
Figure 5B:
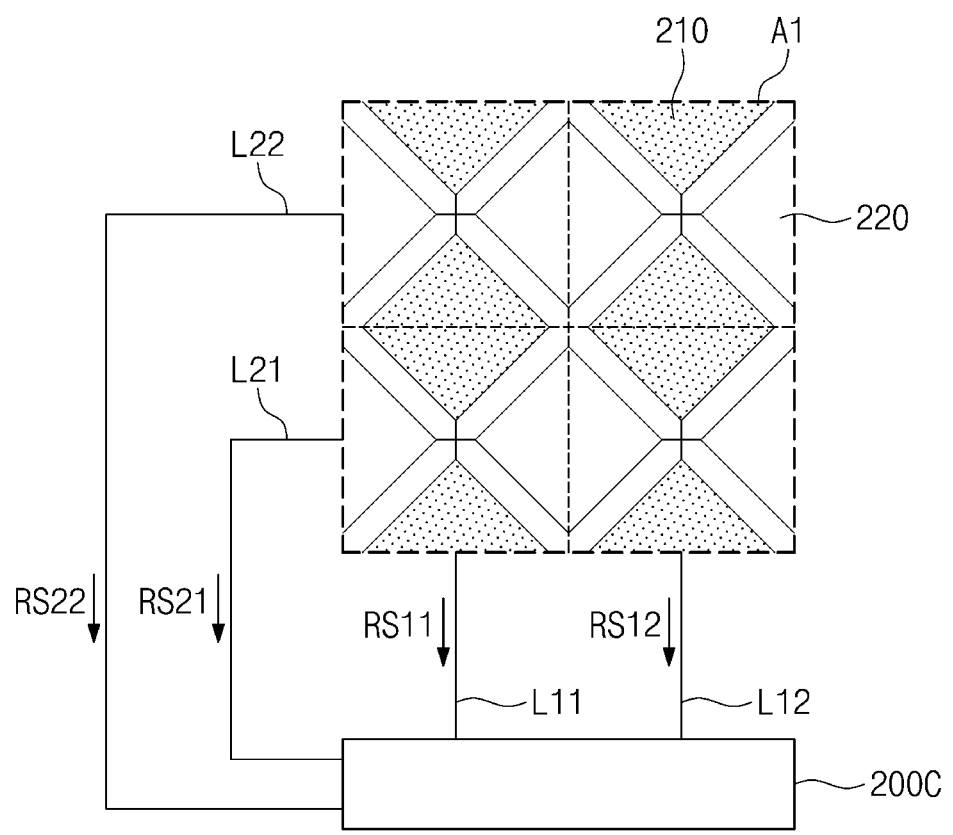

FIGS. 5A and 5B illustrate an operation of an input sensing device during a first sensing mode, according to an embodiment.

FIGS. 5A and 5B show an enlarged area A1 of the sensor 200 shown in FIG. 4.

Referring to FIGS. 4 and 5A, in an embodiment, during a first period of a first sensing mode, the sensor driver 200C outputs first transmission signals to the first electrodes 210 through the first trace lines 210*ta* and outputs second transmission signals to the second electrodes 220 through the second trace lines 220*ta*. In an embodiment, the first trace lines 210*ta* include first trace lines L11 and L12, and the second trace lines 220*ta* include second trace lines L21 and L22.

During the first period of the first sensing mode, the sensor driver 200C respectively outputs first transmission signals TS11 and TS12 to the first trace lines L11 and L12 and respectively outputs second transmission signals TS21 and TS22 to the second trace lines L21 and L22.

Referring to FIG. 5B, in an embodiment, during a second period of the first sensing mode, the sensor driver 200C respectively receives first reception signals RS11 and RS12 from the first electrodes 210 through the first trace lines L11 and L12, and respectively receives second reception signals RS21 and RS22 from the second electrodes 220 through the second trace lines L21 and L22.

Referring to FIGS. 5A and 5B, in an embodiment, the sensor driver 200C senses the touch 2000 (see FIG. 2) based on a difference, such as a change in capacitance, between the first transmission signals TS11 and TS12 provided to the first trace lines L11 and L12 and the first reception signals RS11 and RS12 received from the first trace lines L11 and L12, and a difference, such as a change in capacitance, between the second transmission signals TS21 and TS22 provided to the second trace lines 220*ta* and the second reception signals RS21 and RS22 received from the second trace lines L21 and L22.

In an embodiment, the sensor driver 200C generates a first sensing signal Cs (see FIG. 8) based on a difference, such as a change in capacitance, between the first transmission signals TS11 and TS12 and the first reception signals RS11 and RS12, and a difference, such as a change in capacitance, between the second transmission signals TS21 and TS22 and the second reception signals RS21 and RS22.

Figure 6:
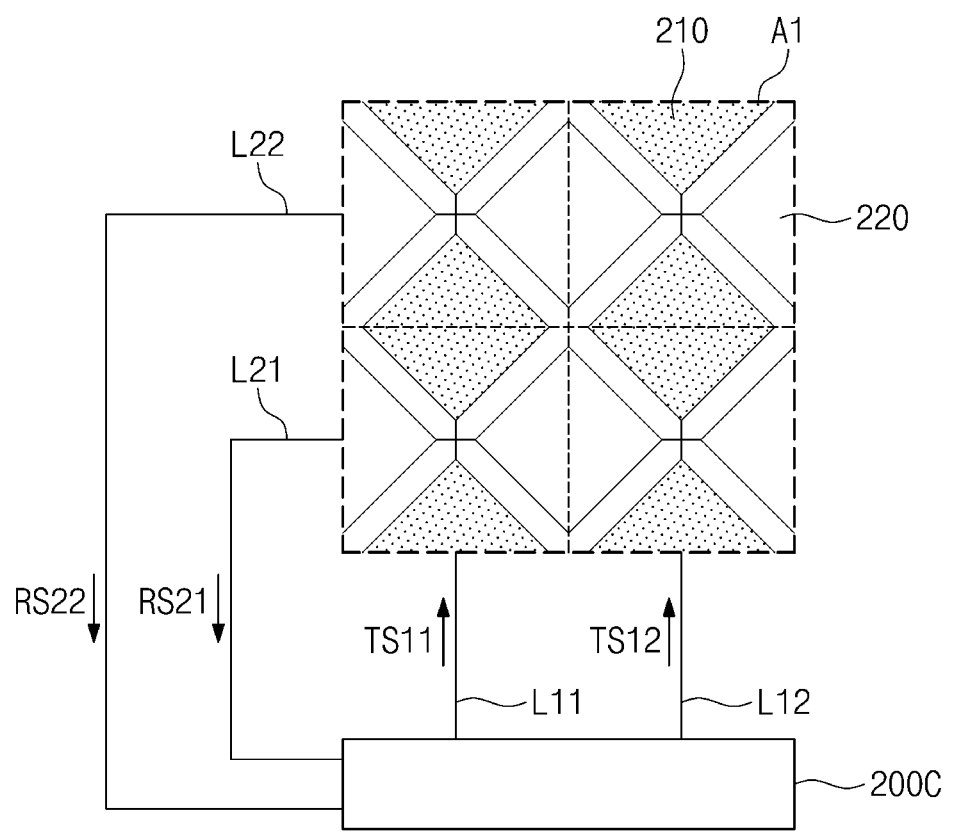
FIG. 6 illustrates an operation of an input sensing device in a second sensing mode, according to an embodiment of the present disclosure.

FIG. 6 illustrates an operation of an input sensing device during a second sensing mode.

FIG. 6 shows the enlarged area µl of the sensor 200 shown in FIG. 4.

Referring to FIG. 6, in an embodiment, during a second sensing mode, the sensor driver 200C outputs transmission signals to the first trace lines 210*ta* and receives reception signals from the second trace lines 220*ta*. In an embodiment, the first trace lines 210*ta* include the first trace lines L11 and L12, and the second trace lines 220*ta* include the second trace lines L21 and L22.

For example, during the second sensing mode, the sensor driver 200C outputs the first transmission signals TS11 and TS12 to the first trace lines L11 and L12, respectively, and receives the second reception signals RS21 and RS22 from the second trace lines L21 and L22, respectively.

The sensor driver 200C senses the touch 2000 (see FIG. 2) by transmitting first transmission signals TS11 and TS12 to the first trace lines L11 and L12 and detecting capacitance changes of the second reception signals RS21 and RS22 received from the second trace lines L21 and L22.

In an embodiment, the sensor driver 200C generates a second sensing signal Cm (see FIG. 8) that corresponds to the capacitance changes of the second reception signals RS21 and RS22.

An operation of the input sensing device during the second sensing mode is not necessarily limited to an embodiment of FIG. 6. In an embodiment, the sensor driver 200C outputs the second transmission signals TS21 and TS22 to the second trace lines L21 and L22, respectively, and receives the first reception signals RS11 and RS12 from the first trace lines L11 and L12, respectively.

Figure 7:
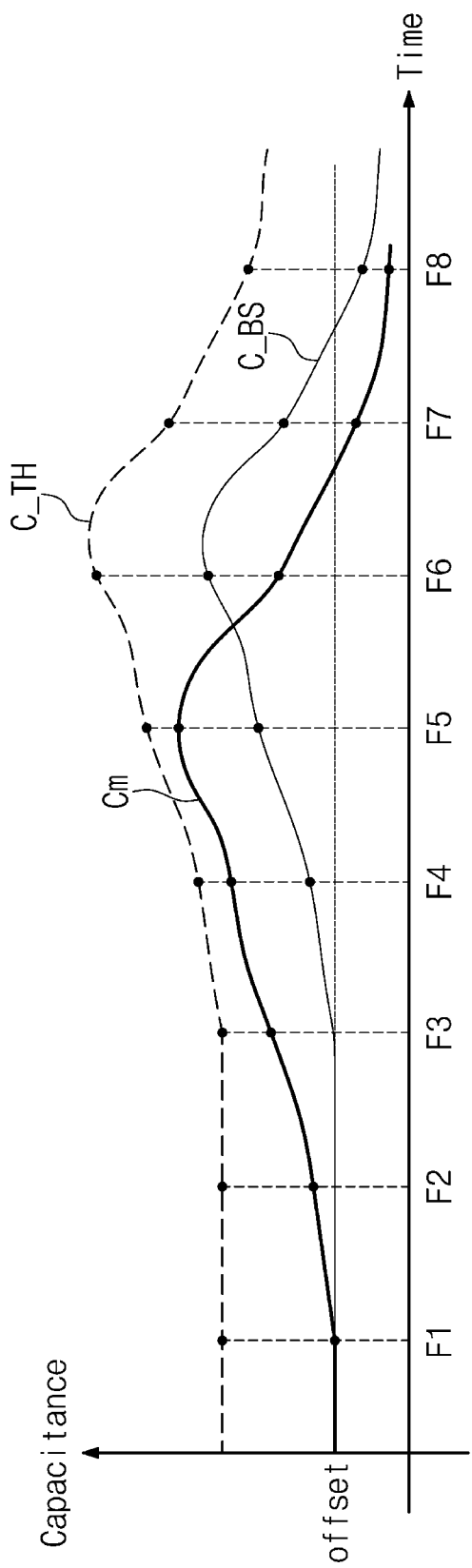
FIG. 7 illustrates an operation of a sensor driver, according to an embodiment of the present disclosure.

FIG. 7 illustrates an operation of the sensor driver 200C, according to an embodiment of the present disclosure.

Referring to FIGS. 6 and 7, in an embodiment, the sensor driver 200C senses the touch 2000 (see FIG. 2) based on capacitance changes of the second reception signals RS21 and RS22 received from the second trace lines L21 and L22, respectively, when the first transmission signals TS11 and TS12 are respectively transmitted to the first trace lines L11 and L12.

When a second sensing signal Cm obtained from the second reception signals RS21 and RS22 is greater than a reference value C_TH, the sensor driver 200C determines that the touch 2000 (see FIG. 2) has occurred. In an embodiment, the second sensing signal Cm is the capacitance of each of the second reception signals RS21 and RS22.

The capacitance between the plurality of first electrodes 210 and the plurality of second electrodes 220 changes according to an external environment, such as temperature. Accordingly, the sensor driver 200C changes the reference value C_TH for each of frames F1 to F8, depending on the external environment.

In an embodiment, the sensor driver 200C detects the external environment and updates a baseline C_BS based on the detected external environment. The sensor driver 200C changes the reference value C_TH based on the baseline C_BS. When the touch 2000 has not occurred, the baseline C_BS is the base capacitance of each of the second reception signals RS21 and RS22 respectively received from the second trace lines L21 and L22.

In an embodiment, when the touch 2000 (see FIG. 2) has not occurred, the sensor driver 200C operates in a second sensing mode that senses the external environment and obtains the second sensing signal Cm. The sensor driver 200C calculates the second sensing signal Cm based on the second reception signals RS21 and RS22 received from the second trace lines L21 and L22.

The sensor driver 200C calculates the second sensing signal Cm based on the second reception signals RS21 and RS22 and changes the baseline C_BS based on the second sensing signal Cm. Accordingly, the reference value C_TH changes several frames after the external environment has changed.

In addition, the sensor driver 200C calculates the second sensing signal Cm based on the second reception signals RS21 and RS22 received under the condition that the touch 2000 (see FIG. 2) has not occurred, and thus the sensor driver 200C might not respond in real time to a change in the external environment.

When the reference value C_TH remains at a low level because the baseline C_BS changes slowly when the external environment changes rapidly, the sensor driver 200C recognizes that the second sensing signal Cm is greater than the reference value C_TH, and determined that the touch 2000 has occurred even though no touch 2000 (see FIG. 2) has occurred.

On the other hand, when the reference value C_TH remains at a high level because the baseline C_BS changes slowly, the sensor driver 200C recognizes that the second sensing signal Cm is less than the reference value C_TH, and determines that the touch 2000 has not occurred even though the touch 2000 (see FIG. 2) has occurred.

In FIG. 7, an offset is a correction value based on characteristics of an analog front end (AFE) circuit that detects an analog capacitance signal in the sensor driver 200C. The offset is a different value for each input sensing device.

Figure 8:
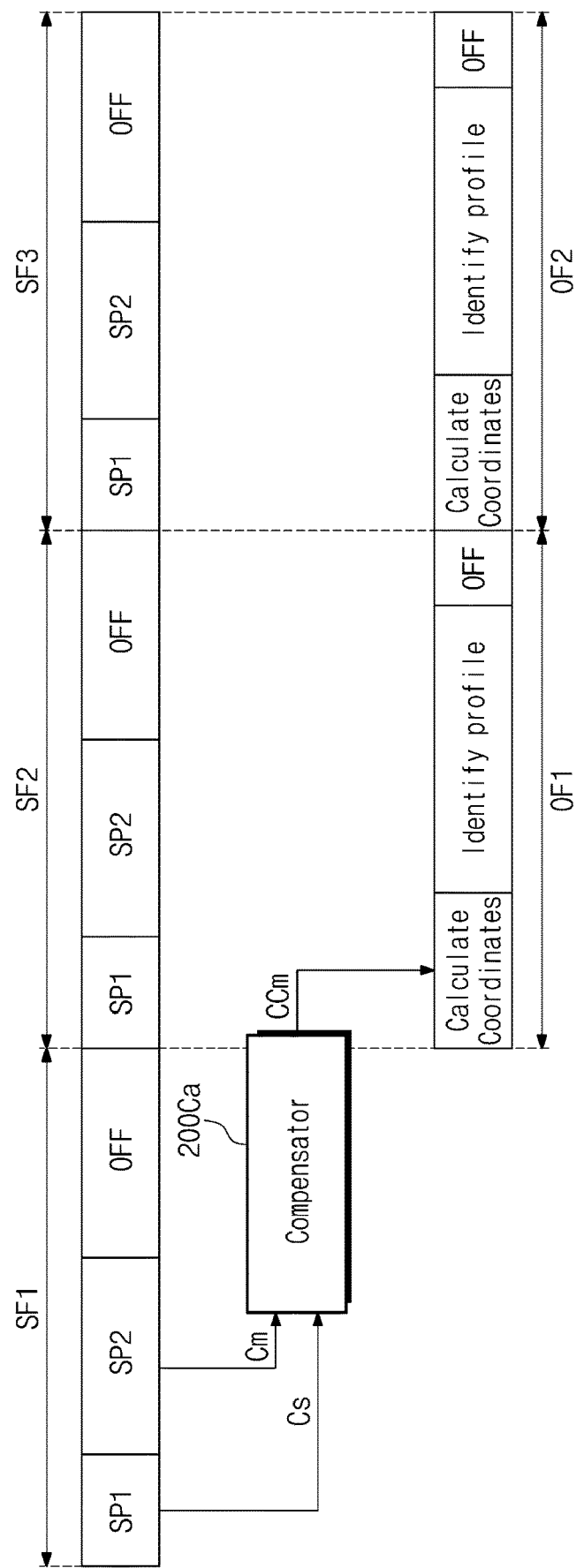
FIG. 8 illustrates an operation of a compensator in a sensor driver, according to an embodiment of the present disclosure.

FIG. 8 illustrates an operation of a compensator 200Ca in a sensor driver, according to an embodiment of the present disclosure.

Referring to FIG. 8, in an embodiment, the sensor driver 200C (see FIG. 2) includes a compensator 200Ca. During each of a first sensing frame SF1, a second sensing frame SF2, and a third sensing frame SF3, the compensator 200Ca receives the first sensing signal Cs and the second sensing signal Cm from the sensor 200. The first sensing frame SF1, the second sensing frame SF2, and the third sensing frame SF3 are continuous with each other. For example, the second sensing frame SF2 immediately follows the first sensing frame SF1, and the third sensing frame SF3 immediately follows the first sensing frame SF2.

Each of the first sensing frame SF1, the second sensing frame SF2, and the third sensing frame SF3 includes a first sensing period SP1, a second sensing period SP2, and an off period OFF. In an embodiment, the first sensing period SP1 is when an operation is performed in the first sensing mode shown in FIGS. 5A and 5B. In an embodiment, the second sensing period SP2 is when an operation is performed in the second sensing mode shown in FIG. 6.

The first sensing signal Cs received from the sensor 200 is a capacitance change obtained during the first sensing mode shown in FIGS. 5A and 5B. The second sensing signal Cm received from the sensor 200 is a capacitance change obtained during the second sensing mode shown in FIG. 6.

The compensator 200Ca outputs a compensated sensing signal CCm compensated based on the first sensing signal Cs and the second sensing signal Cm.

During a first output frame OF1, the sensor driver 200C calculates touch coordinates based on the compensated sensing signal CCm of the first sensing frame SF1, identifies a profile, and outputs a coordinate signal. The coordinate signal indicates a location of the touch 2000 (see FIG. 2) and is provided to the main driver 1000C (see FIG. 2).

During a second output frame OF2, the sensor driver 200C calculates touch coordinates based on the compensated sensing signal CCm of the second sensing frame SF2, identifies a profile, and outputs a coordinate signal.

In an embodiment, each of the first sensing frame SF1, the second sensing frame SF2, the third sensing frame SF3, the first output frame OF1, and the second output frame OF2 have the same duration as each other. The second sensing frame SF2 and the first output frame OF1 temporally overlap. The third sensing frame SF3 and the second output frame OF2 temporally overlap.

Figure 9:
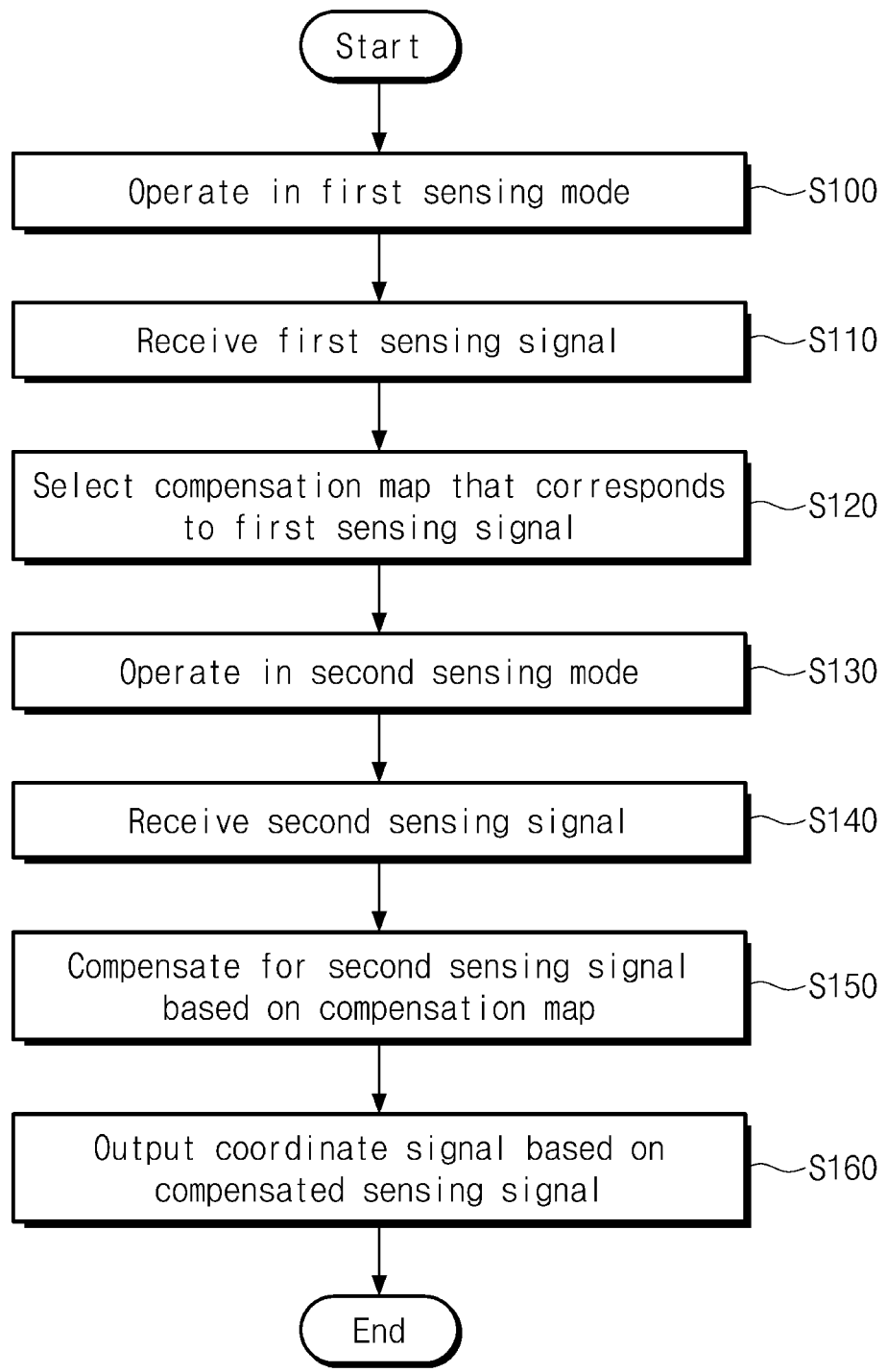
FIG. 9 is a flowchart of an operation of an input sensing device, according to an embodiment of the present disclosure.

FIG. 9 is a flowchart of an operation of an input sensing device, according to an embodiment of the present disclosure.

Referring to FIGS. 5A, 5B, 6, and 9, in an embodiment, during the first sensing period SP1 of the first sensing frame SF1, the sensor driver 200C operates in a first sensing mode (operation S100). The sensor driver 200C respectively outputs first transmission signals to the first electrodes 210 through the first trace lines 210a and respectively outputs second transmission signals to the second electrodes 220 through the second trace lines 220ta.

The sensor driver 200C respectively receives first reception signals RS11 and RS12 from the first electrodes 210 through the first trace lines L11 and L12, and respectively receives second reception signals RS21 and RS22 from the second electrodes 220 through the second trace lines L21 and L22.

The sensor driver 200C calculates the first sensing signal Cs based on a difference, such as a capacitance change, between the first transmission signals TS11 and TS12 and the first reception signals RS11 and RS12, and a difference, such as a capacitance change, between the second transmission signals TS21 and TS22 and the second reception signals RS21 and RS22. The compensator 200Ca receives the first sensing signal Cs (operation S110).

The compensator 200Ca selects a compensation map that corresponds to the first sensing signal Cs from a plurality of compensation maps (operation S120). The compensation map will be described with reference to FIG. 10.

During the second sensing period SP2 of the first sensing frame SF1, the sensor driver 200C operates in a second sensing mode (operation S130). For example, while transmitting the first transmission signals TS11 and TS12 to the first trace lines L11 and L12, the sensor driver 200C calculates the second sensing signal Cm based on a capacitance change of each of the second reception signals RS21 and RS22 received from the second trace lines L21 and L22. The compensator 200Ca receives the second sensing signal Cm (operation S140).

The compensator 200Ca compensates for the second sensing signal Cm based on the selected compensation map and outputs the compensated sensing signal CCm (operation S150).

The sensor driver 200C outputs a coordinate signal based on the compensated sensing signal CCm (operation S160).

Figure 10:
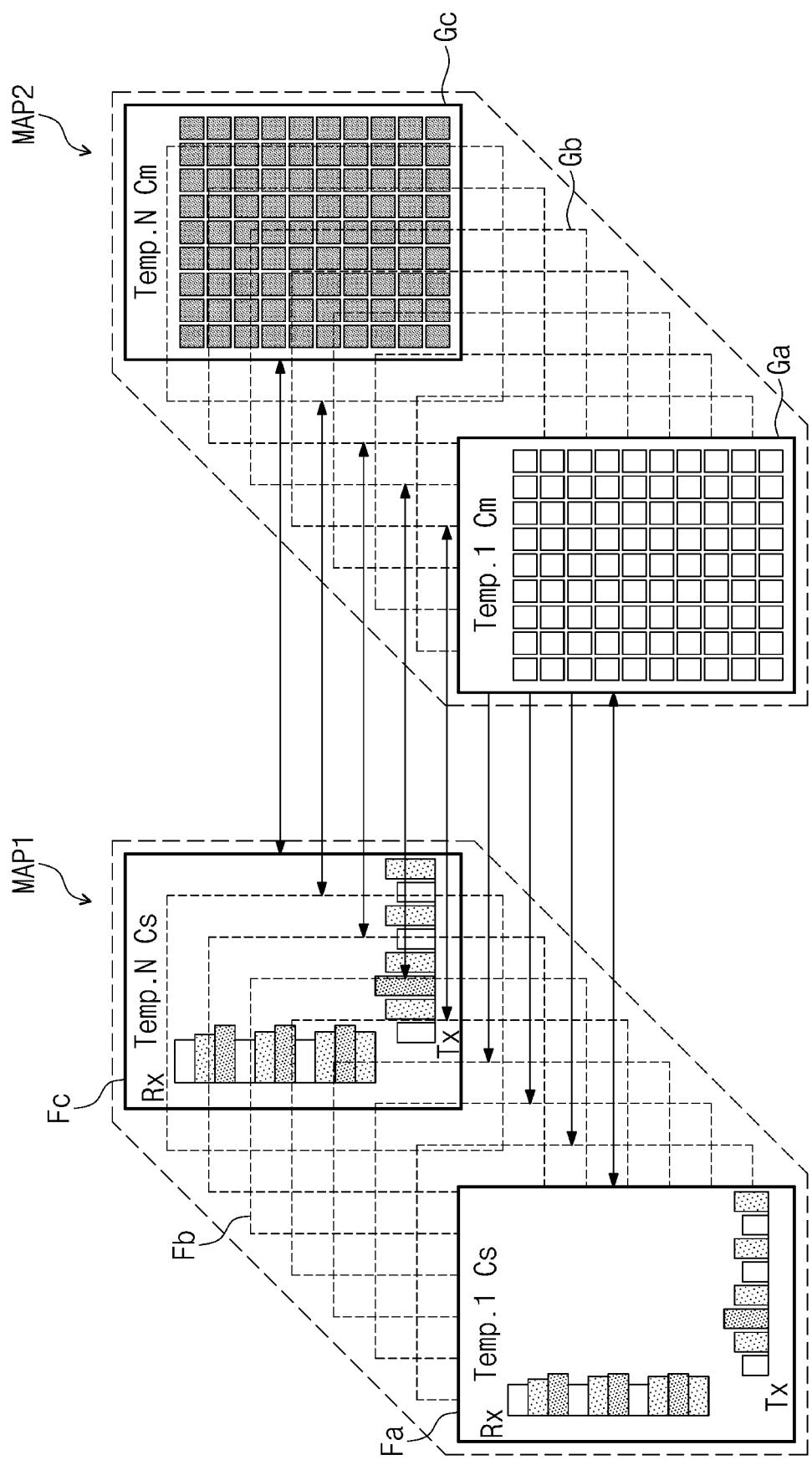
FIG. 10 shows a plurality of compensation maps, according to an embodiment of the present disclosure.

FIG. 10 shows a plurality of compensation maps, according to an embodiment.

Referring to FIGS. 8 and 10, in an embodiment, the compensator 200Ca includes a first compensation map array MAP1 and a second compensation map array MAP2.

During a stage of producing the display device 1000 (see FIG. 2), the first compensation map array MAP1 and the second compensation map array MAP2 are stored in a memory, such as a non-volatile memory such as a flash memory, of the compensator 200Ca.

The first compensation map array MAP1 includes first, second and third first compensation maps Fa, Fb, and Fc. Each of the first, second and third first compensation maps Fa, Fb, and Fc stores characteristics of the first sensing signal Cs received from the sensor 200 based on an external environment. For example, the first first compensation map Fa stores the characteristics of the first sensing signal Cs received from the sensor 200 at a first temperature. The second first compensation map Fb stores the characteristics of the first sensing signal Cs received from the sensor 200 at a second temperature. The third first compensation map Fc stores the characteristics of the first sensing signal Cs received from the sensor 200 at a third temperature. The first temperature, the second temperature, and the third temperature differ from each other.

While the sensor driver 200C operates in the first sensing mode shown in FIGS. 5A and 5B when ambient temperatures are the first temperature, the second temperature, or the third temperature, each of the first, second and third first compensation maps Fa, Fb, and Fc corresponds to a sensing signal received from the sensor 200.

In an embodiment, when the ambient temperatures are the first temperature, the second temperature, or the third temperature, each of the first, second and third first compensation maps Fa, Fb, and Fc includes a representative value, such as an arithmetic mean, a median, a mode, etc., of a sensing signal received from the sensor 200.

The second compensation map array MAP2 includes first, second and third second compensation maps Ga, Gb, and Gc. Each of the first, second and third second compensation maps Ga, Gb, and Gc stores a compensation value that compensates for the second sensing signal Cm received from the sensor 200 based on the external environment. For example, the first second compensation map Ga stores a compensation value for the second sensing signal Cm at the first temperature. The second second compensation map Gb stores a compensation value for the second sensing signal Cm at the second temperature. The third second compensation map Gc stores a compensation value for the second sensing signal Cm at the third temperature.

In an embodiment, the number of first compensation maps Fa, Fb, and Fc in the first compensation map array MAP1 is the same as the number of second compensation maps Ga, Gb, and Gc in the second compensation map array MAP2. In addition, although FIG. 10 shows three first compensation maps Fa, Fb, and Fc and three second compensation maps Ga, Gb, and Gc, this is for convenience of illustration, and embodiments are not necessarily limited thereto. In other embodiments, there may be two first compensation maps and two second compensation maps, or four or more first compensation maps and four or more second compensation maps, as long as the number of first compensation maps equals the number of second compensation maps.

In an embodiment, the first compensation maps Fa, Fb, and Fc in the first compensation map array MAP1 have a one-to-one correspondence with the second compensation maps Ga, Gb, and Gc in the second compensation map array MAP2.

During the first sensing period SP1 shown in FIG. 8, the compensator 200Ca calculates a representative value of the first sensing signal Cs received from the sensor 200 and selects a compensation map whose representative value is most similar to the representative value of the first sensing signal Cs from the first compensation maps Fa, Fb, and Fc. For example, a difference between the most similar compensation map representative value and first sensing signal representative value is less than the difference between other compensation map representative values and the first sensing signal representative value.

When the representative value of the first sensing signal Cs received from the sensor 200 corresponds to the first first compensation map Fa, the compensator 200Ca selects the first second compensation map Ga that corresponds to the first first compensation map Fa during the first sensing period SP1. The compensator 200Ca compensates for the second sensing signal Cm based on the selected first second compensation map Ga and outputs the compensated sensing signal CCm.

When the representative value of the first sensing signal Cs received from the sensor 200 corresponds to the second first compensation map Fb, the compensator 200Ca selects the second second compensation map Gb that corresponds to the second first compensation map Fb during the first sensing period SP1. The compensator 200Ca compensates for the second sensing signal Cm based on the selected second second compensation map Gb and outputs the compensated sensing signal CCm.

When the representative value of the first sensing signal Cs received from the sensor 200 corresponds to the third first compensation map Fc, the compensator 200Ca selects the third second compensation map Gc that corresponds to the third first compensation map Fc during the first sensing period SP1. The compensator 200Ca compensates for the second sensing signal Cm based on the selected third second compensation map Gc and outputs the compensated sensing signal CCm.

Returning to FIG. 8, the compensator 200Ca outputs the compensated sensing signal CCm compensated based on the first sensing signal Cs and the second sensing signal Cm of the first sensing frame SF1.

During the first output frame OF1, the sensor driver 200C outputs a coordinate signal based on the compensated sensing signal CCm.

For example, the sensor driver 200C outputs the compensated sensing signal CCm compensated based on the first sensing signal Cs and the second sensing signal Cm detected in the first sensing frame SF1 and output a coordinate signal based on the compensated sensing signal CCm during the first output frame OF1.

In an embodiment, a compensation value stored in each of the first, second and third second compensation maps Ga, Gb, and Gc is for updating the baseline C_BS (see FIG. 7) based on an external environment.

The sensor driver 200C updates a baseline in real time based on the first sensing signal Cs and the second sensing signal Cm detected in the first sensing frame SF1, and thus securely sense the touch 2000 (see FIG. 2) regardless of changes in the external environment.

Figure 11:
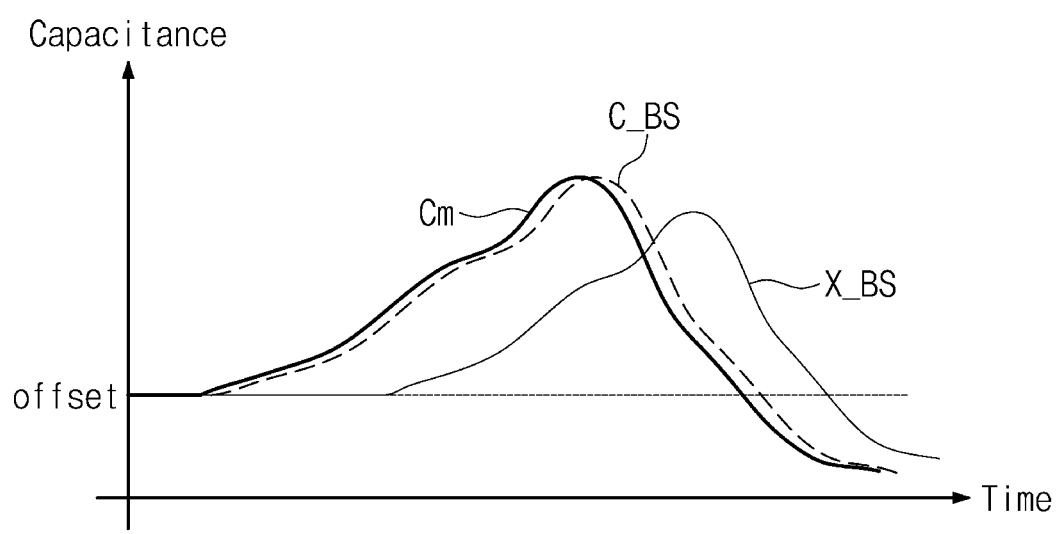
FIG. 11 is a graph of the performance of an input sensing device, according to an embodiment of the present disclosure.

FIG. 11 is a graph of the performance of an input sensing device, according to an embodiment of the present disclosure.

Referring to FIGS. 6, 8, and 11, in an embodiment, when the touch 2000 (see FIG. 2) has not occurred, the compensator 200Ca in the sensor driver 200C obtains the first sensing signal Cs by operating in the first sensing mode and obtains the second sensing signal Cm by operating in the second sensing mode.

The sensor driver 200C updates the baseline C_BS in real time based on the first sensing signal Cs and the second sensing signal Cm.

Accordingly, the baseline C_BS changes similar to the second sensing signal Cm obtained in the second sensing mode.

In a conventional method, the external environment is detected and the baseline X_BS is changed according to the detected external environment. Accordingly, the baseline X_BS is slowly changed.

According to an embodiment of the present disclosure, a first compensation map and a second compensation map can be selected based on the first sensing signal Cs during every sensing frame and the second sensing signal Cm can be compensated depending on the selected second compensation map. Accordingly, the second sensing signal Cm can be compensated in real time, similar to the baseline C_BS. As a result, the touch sensing performance of the input sensing device is increased.

Figure 12A:
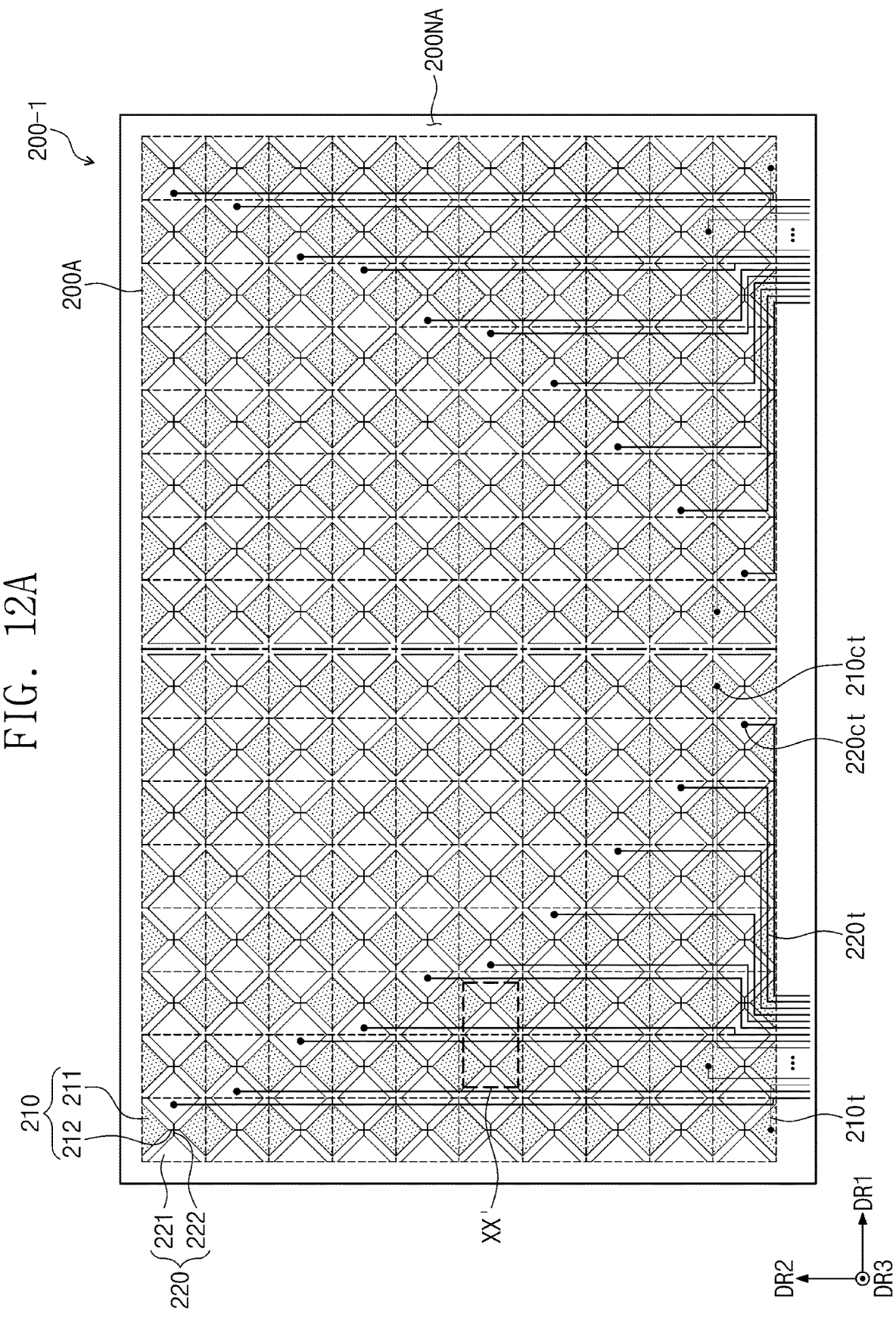
FIG. 12A is a plan view of a sensor, according to an embodiment of the present disclosure.
Figure 12B:
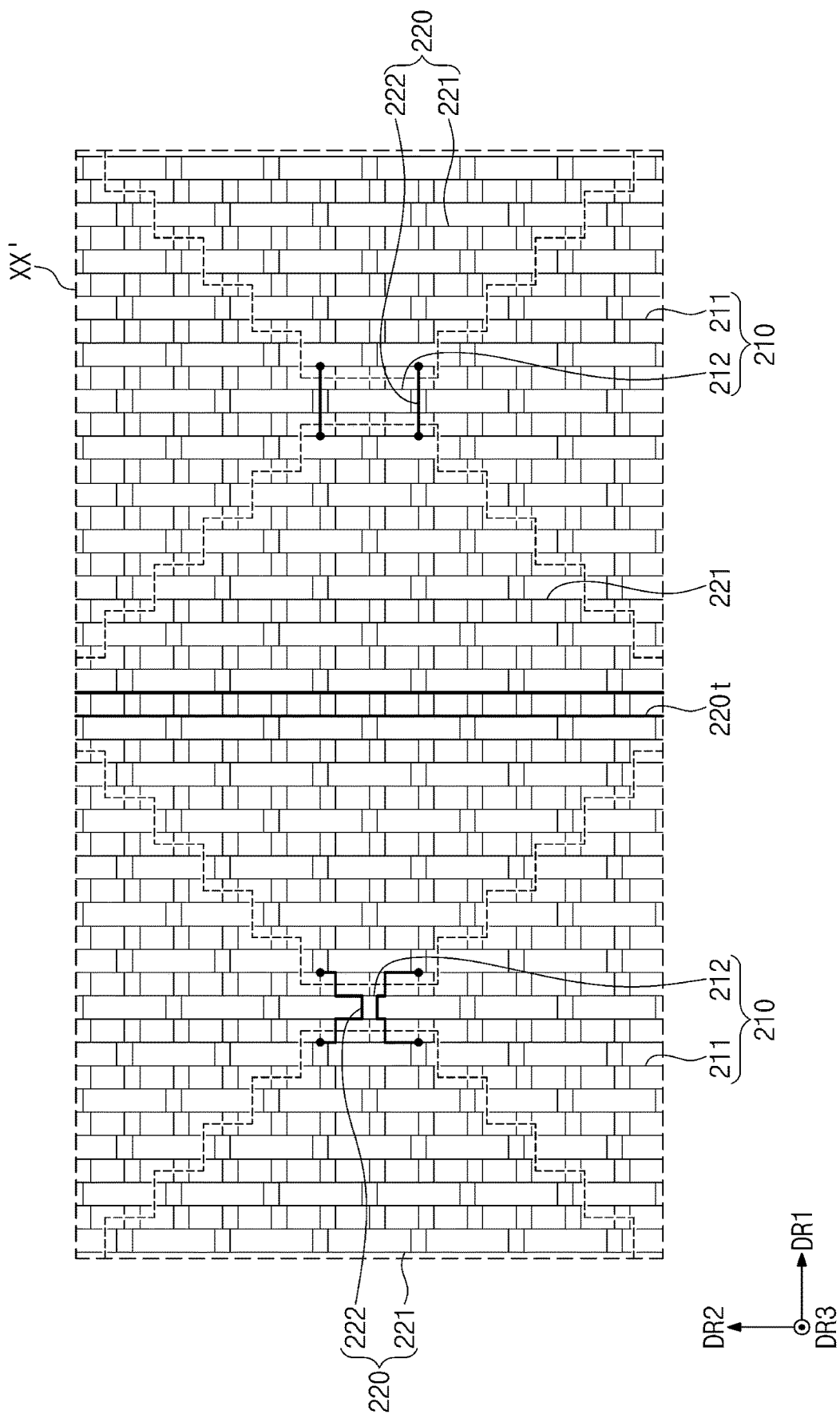
FIG. 12B is an enlarged plan view of area XX' shown in FIG. 12A, according to an embodiment of the present disclosure.

FIG. 12A is a plan view of a sensor 200-1, according to an embodiment of the present disclosure. FIG. 12B is an enlarged plan view of area XX' shown in FIG. 12A. In the description of FIGS. 12A and 12B, the same reference numerals refer to the same components described with reference to FIG. 4, and thus repeated descriptions thereof are omitted to avoid redundancy.

Referring to FIGS. 12A and 12B, in an embodiment, the sensor 200-1 includes the plurality of first electrodes 210, the plurality of second electrodes 220, a plurality of first trace lines 210t, and a plurality of second trace lines 220t.

In an embodiment of the present disclosure, the first trace lines 210t extend to overlap the sensing area 200A.

In an embodiment of the present disclosure, the second trace lines 220t extend to overlap the sensing area 200A. For example, the second trace lines 220t are not disposed in the peripheral area 200NA adjacent to the sensing area 200A in the first direction DR1. Accordingly, the area of the peripheral area 200NA can be reduced. As a result, an area occupied by the non-display area NDA (see FIG. 1) on the display surface IS (see FIG. 1) of the display device 1000 (see FIG. 1) can be reduced, thereby implementing a narrow bezel.

Moreover, in an embodiment of the present disclosure, the length of the second electrodes 220 increases by the aspect ratio of the display device 1000 (see FIG. 1), and thus the load of the second electrodes 220 is increased. For example, to reduce the load of the second electrodes 220, each of the second electrodes 220 is divided into a plurality of division electrodes. For example, when each of the second electrodes 220 is divided into 3 or more electrodes, the division electrodes spaced from the peripheral area 200NA are electrically connected to the second trace lines 220t that overlap the sensing area 200A.

The first electrodes 210 and the first trace lines 210t are connected through a plurality of first contacts 210ct. The second electrodes 220 and the second trace lines 220t are connected through a plurality of second contacts 220ct. In an embodiment of the present disclosure, both the first contacts 210ct and the second contacts 220ct overlap the sensing area 200A. However, embodiments are not necessarily limited thereto. In an embodiment, the first contacts 210ct overlap the peripheral area 200NA.

The second trace lines 220t are disposed on the same layer as the connection patterns 222. When viewed in a plan view, such as in the third direction DR3, the second trace lines 220t do not overlap the first electrodes 210. The second trace lines 220t overlap the second electrodes 220. Accordingly, the effect of signal interference or parasitic capacitance between the first electrodes 210 and the second trace lines 220t can be minimized.

Figure 13:
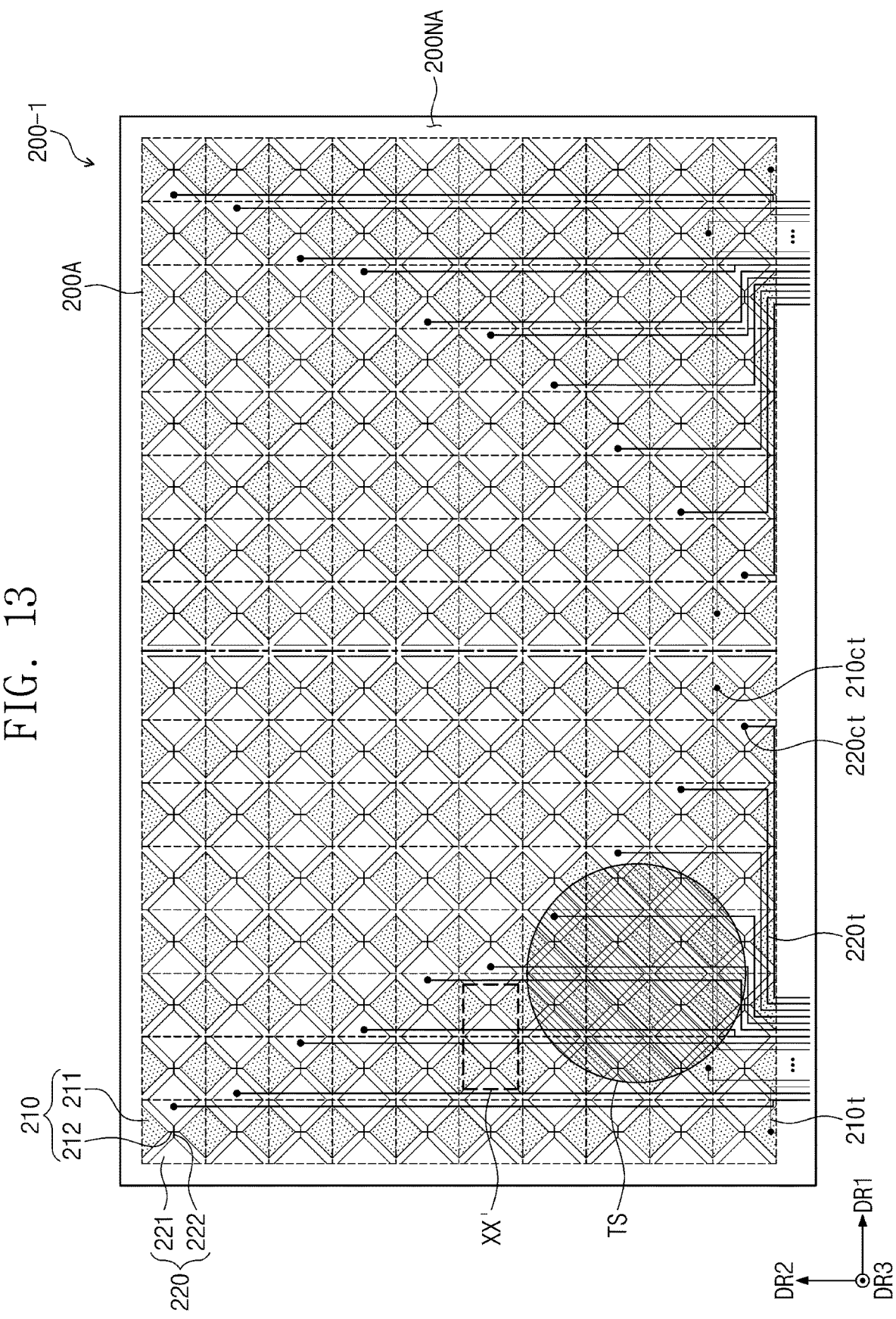
FIG. 13 illustrates a test method for an input sensing device, according to an embodiment of the present disclosure.

FIG. 13 shows a test method for an input sensing device.

Referring to FIGS. 2 and 13, in an embodiment, one method for testing the performance of an input sensing device includes placing a conductive disk TS on an upper surface of the sensor 200-1.

When the conductive disk TS is placed on the upper surface of the sensor 200-1, the input sensing device recognizes that the conductive disk TS is the same as the touch 2000 (see FIG. 2). The sensor driver 200C outputs coordinates in which the conductive disk TS is placed by detecting a change of the second sensing signal Cm between the first electrodes 210 and the second electrodes 220 that are in contact with the conductive disk TS.

Figure 14:
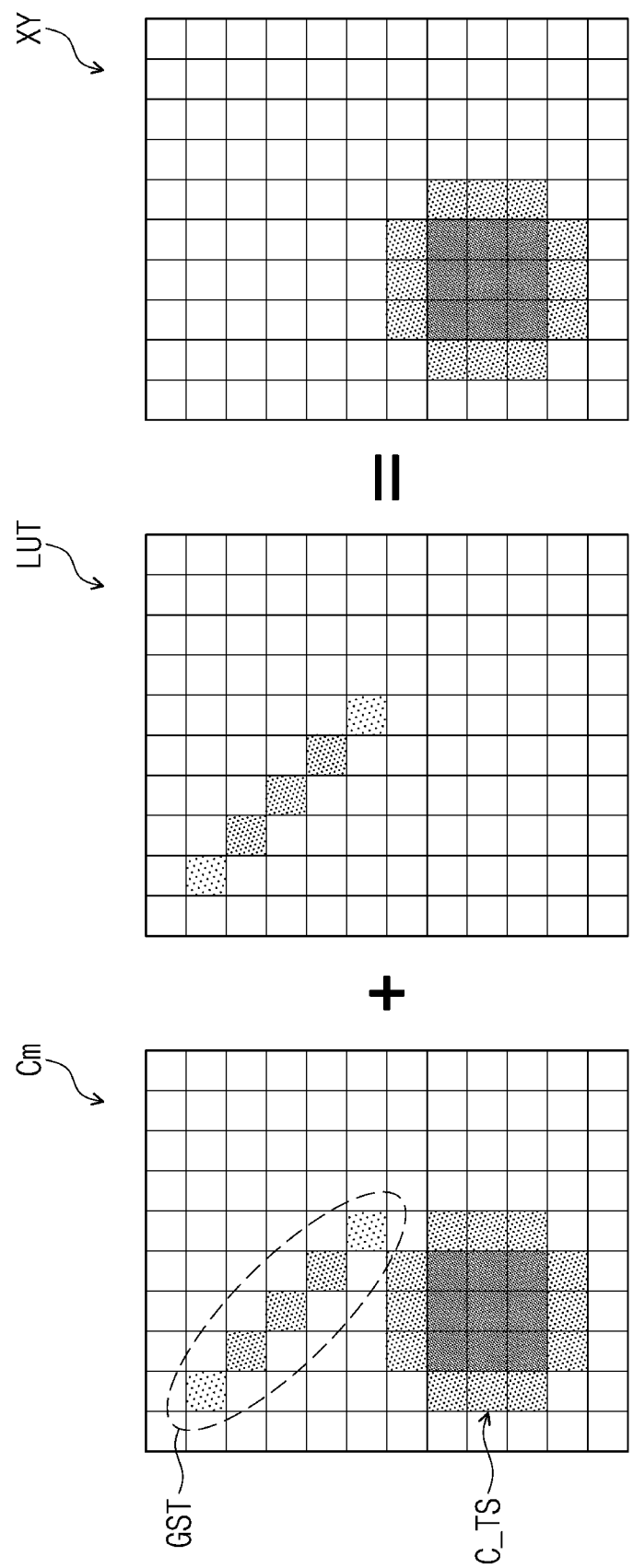
FIG. 14 illustrates a ghost removing method of an input sensing device, according to an embodiment of the present disclosure.

FIG. 14 illustrates a ghost removing method of an input sensing device, according to an embodiment of the present disclosure.

FIG. 14 graphically illustrates the second sensing signal Cm received from the sensor 200-1.

Referring to FIGS. 13 and 14, in an embodiment, in some cases, the sensor driver 200C (see FIG. 2) needs to output coordinates that correspond to an area C_TS in which the conductive disk TS is placed by detecting a capacitance change of the first electrodes 210 and the second electrodes 220 that are in contact with the conductive rod TS.

As shown in FIG. 13, the second trace lines 220t that overlap the sensing area 200A are in contact with the conductive disk TS. The capacitance change of the second trace lines 220t in contact with the conductive rod TS is provided to the second electrodes 220 through the second contacts 220ct.

As a result, because the capacitance of the second electrodes 220, in which the second contacts 220ct are located, changes, undesirable noise or ghosts GST may be included in the second sensing signal Cm.

The compensator 200Ca (see FIG. 8) of the sensor driver 200C further include a lookup table LUT.

The lookup table LUT stores compensation values that compensate for the second sensing signal Cm received from the second electrodes 220 that overlap the second contacts 220ct.

The compensator 200Ca compensates for the second sensing signal Cm based on the first sensing signal Cs and the second sensing signal Cm, performs ghost compensation with reference to the lookup table LUT, and outputs the compensated sensing signal CCm.

As a result, a coordinate signal XY output from the sensor driver 200C does not include the ghost GST.

An input sensing device having such the configuration selects a first compensation map and a second compensation map based on a first sensing signal obtained in a first sensing mode during every sensing frame and compensates for a second sensing signal obtained in a second sensing mode based on the selected second compensation map. Accordingly, the second sensing signal can be compensated in real time. As a result, the touch sensing performance of the input sensing device is increased.

While embodiments of the present disclosure have been described with reference to drawings thereof, it will be apparent to those of ordinary skill in the art that various changes and modifications may be made thereto without departing from the spirit and scope of embodiments of the present disclosure as set forth in the following claims.

What is claimed is:

1. An input sensing device, comprising:
a sensor that includes a plurality of first electrodes and a plurality of second electrodes; and
a sensor driver that operates in a first sensing mode and a second sensing mode,
wherein, during the first sensing mode, the sensor driver generates a first sensing signal by transmitting transmission signals to the sensor and receiving first reception signals from the sensor,
wherein, during the second sensing mode, the sensor driver generates a second sensing signal by transmitting the transmission signals to the sensor and receiving second reception signals from the sensor, and
wherein the sensor driver selects one of a plurality of compensation maps based on the first sensing signal, compensates the second sensing signal based on the selected compensation map, and outputs a compensated sensing signal.

2. The input sensing device of claim 1, wherein the sensor driver generates the first sensing signal during a first sensing period of a first sensing frame, and generates the second sensing signal during a second sensing period of the first sensing frame.

3. The input sensing device of claim 2,
wherein, during a first output frame, the sensor driver outputs a coordinate signal that corresponds to the compensated sensing signal,
wherein the first output frame temporally overlaps a second sensing frame, and
wherein the second sensing frame is continuous with the first sensing frame.

4. The input sensing device of claim 1, wherein the sensor driver comprises a compensator that selects one of the plurality of compensation maps based on the first sensing signal and outputs the compensated sensing signal based on the selected compensation map.

5. The input sensing device of claim 4,
wherein the plurality of compensation maps comprises a plurality of first compensation maps and a plurality of second compensation maps, and
wherein the compensator selects one of the plurality of first compensation maps that corresponds to the first sensing signal, compensates the second sensing signal based on one of the plurality of second compensation maps that corresponds to the selected first compensation map, and outputs the compensated sensing signal.

6. The input sensing device of claim 5, wherein each of the plurality of first compensation maps stores a representative value of a sensing signal according to an ambient temperature, wherein the ambient temperature for each of the plurality of first compensation maps differ from each other.

7. The input sensing device of claim 6, wherein the compensator calculates a representative value of the first sensing signal, and selects one of the plurality of first compensation maps whose representative value is most similar to the representative value of the first sensing signal.

8. The input sensing device of claim 5, wherein the plurality of first compensation maps and the plurality of second compensation maps have a one-to-one correspondence.

9. The input sensing device of claim 1, wherein, during the first sensing mode, the sensor driver transmits first transmission signals to the plurality of first electrodes, transmits second transmission signals to the plurality of second electrodes, receives a first reception signal from the plurality of first electrodes, receives a second reception signal from the plurality of second electrodes, and generates the first sensing signal based on the first transmission signals, the second transmission signals, the first reception signal, and the second reception signal.

10. The input sensing device of claim 1, wherein, during the second sensing mode, the sensor driver transmits the transmission signals to the plurality of first electrodes, receives the second reception signals from the plurality of second electrodes, and generates the second sensing signal based on the second reception signals.

11. The input sensing device of claim 1,
wherein the sensor includes a sensing area and a peripheral area adjacent to the sensing area,
wherein the plurality of first electrodes are arranged in the sensing area in a first direction, and
wherein the plurality of second electrodes are arranged in the sensing area in a second direction that crosses the first direction.

12. The input sensing device of claim 11, further comprising:
a plurality of first trace lines electrically connected to the plurality of first electrodes, respectively; and
a plurality of second trace lines electrically connected to the plurality of second electrodes, respectively,
wherein the plurality of first trace lines and the plurality of second trace lines overlap the sensing area.

13. The input sensing device of claim 12,
wherein the plurality of first electrodes are connected to the plurality of first trace lines through a plurality of first contacts, respectively,
wherein the plurality of second electrodes are connected to the plurality of second trace lines through a plurality of second contacts, respectively, and
wherein the plurality of second contacts overlap the plurality of second electrodes, respectively.

14. The input sensing device of claim 1,
wherein the sensor driver further comprises a lookup table that compensates a sensing signal received from the plurality of second electrodes, and
wherein the sensor driver compensates the second sensing signal based on the selected compensation map, performs a ghost compensation with reference to the lookup table, and outputs the compensated sensing signal.

15. A display device, comprising:
a display panel;
a sensor disposed on the display panel and that includes a sensing area and a peripheral area adjacent to the sensing area; and
a sensor driver that drives the sensor,
wherein, during a first sensing mode, the sensor driver generates a first sensing signal by transmitting transmission signals to the sensor and receiving reception signals from the sensor,
wherein, during a second sensing mode, the sensor driver generates a second sensing signal by transmitting the transmission signals to the sensor and receiving the reception signals from the sensor, and
wherein the sensor driver selects one of a plurality of compensation maps based on the first sensing signal, compensates the second sensing signal based on the selected compensation map, and outputs a compensated sensing signal.

16. The display device of claim 15, wherein the sensor driver generates the first sensing signal during a first sensing period of a first sensing frame, and generates the second sensing signal during a second sensing period of the first sensing frame.

17. The display device of claim 15,
wherein the plurality of compensation maps comprises a plurality of first compensation maps and a plurality of second compensation maps, and
wherein the sensor driver selects one of the plurality of first compensation maps that corresponds to the first sensing signal, compensates the second sensing signal based on one of the plurality of second compensation maps that corresponds to the selected first compensation map, and outputs the compensated sensing signal.

18. The display device of claim 17, wherein each of the plurality of first compensation maps stores a representative value of a sensing signal according to an ambient temperature, wherein the ambient temperature for each of the plurality of first compensation maps differ from each other.

19. The display device of claim 18, wherein the sensor driver calculates a representative value of the first sensing signal, and selects one of the plurality of first compensation maps whose representative value is most similar to the representative value of the first sensing signal.

20. The display device of claim 15, wherein the sensor comprises:
   a plurality of first electrodes disposed in the sensing area and arranged in a first direction;
   a plurality of second electrodes disposed in the sensing area and arranged in a second direction that crosses the first direction;
   a plurality of first trace lines that connect the plurality of first electrodes to the sensor driver; and
   a plurality of second trace lines that connect the plurality of second electrodes to the sensor driver.

21. The display device of claim 20,
   wherein the plurality of first electrodes are connected to the plurality of first trace lines through a plurality of first contacts, respectively,
   wherein the plurality of second electrodes are connected to the plurality of second trace lines through a plurality of second contacts, respectively, and
   wherein the plurality of second contacts overlap the plurality of second electrodes, respectively.

22. The display device of claim 21,
   wherein the sensor driver further comprises a lookup table that compensates a sensing signal received from the plurality of second electrodes, and
   wherein the sensor driver compensates the second sensing signal based on the selected compensation map, performs a ghost compensation with reference to the lookup table, and outputs the compensated sensing signal.

23. An input sensing method, the method comprising:
   receiving a first sensing signal from a sensor by operating in a first sensing mode;
   selecting a compensation map that corresponds to the first sensing signal from a plurality of compensation maps;
   receiving a second sensing signal from the sensor by operating in a second sensing mode;
   compensating the second sensing signal based on the compensation map and outputting a compensated sensing signal; and
   outputting a coordinate signal that corresponds to the compensated sensing signal.

24. The input sensing method of claim 23,
   wherein the plurality of compensation maps comprises a plurality of first compensation maps and a plurality of second compensation maps, and
   wherein selecting the compensation map that corresponds to the first sensing signal from the plurality of compensation maps comprises:
   selecting one of the plurality of first compensation maps that corresponds to the first sensing signal, and selecting one of the plurality of second compensation maps that corresponds to the selected first compensation map as the compensation map.

25. The input sensing method of claim 24,
   wherein each of the plurality of first compensation maps stores a representative value of a sensing signal according to an ambient temperature, wherein the ambient temperature for each of the plurality of first compensation maps differ from each other, and
   wherein selecting the compensation map that corresponds to the first sensing signal from the plurality of compensation maps comprises:
   calculating a representative value of the first sensing signal and selecting one of the plurality of first compensation maps whose representative value is most similar to the representative value of the first sensing signal.

* * * * *